United States Patent [19]

Robert et al.

[11] Patent Number: 5,089,887
[45] Date of Patent: Feb. 18, 1992

[54] METHOD AND DEVICE FOR THE ESTIMATION OF MOTION IN A SEQUENCE OF MOVING IMAGES

[75] Inventors: Philippe Robert; Patrick Pineau; Pascal Basset, all of Rennes, France

[73] Assignee: Thomson Consumer Electronics, Courbevoie, France

[21] Appl. No.: 487,956

[22] PCT Filed: Sep. 22, 1989

[86] PCT No.: PCT/FR89/00482

§ 371 Date: May 14, 1990

§ 102(e) Date: May 14, 1990

[87] PCT Pub. No.: WO90/03619

PCT Pub. Date: Apr. 5, 1990

[30] Foreign Application Priority Data

Sep. 23, 1988 [FR] France .................. 88 12468
Jun. 9, 1989 [FR] France .................. 89 07673

[51] Int. Cl.$^5$ .................................................. H04N 7/01
[52] U.S. Cl. ................................. 358/105; 358/140
[58] Field of Search ............... 358/105, 140, 138, 133

[56] References Cited

U.S. PATENT DOCUMENTS

| | | | |
|---|---|---|---|
| 4,766,490 | 8/1988 | Haghiri | 358/105 |
| 4,853,775 | 8/1989 | Rouvrais et al. | 358/105 |
| 4,864,393 | 9/1989 | Harradine et al. | 358/140 X |
| 4,864,394 | 9/1989 | Gillard | 358/140 X |
| 4,924,308 | 5/1990 | Feuchtwanger | 358/105 |
| 4,937,667 | 6/1990 | Choquet et al. | 358/140 |
| 4,989,087 | 1/1991 | Pele et al. | 358/105 |

OTHER PUBLICATIONS

Computer Vision, Graphics and Image Processing, vol. 21, No. 2, Feb. 1983, Academic Press Inc. (New York, US), J. Stuller et al.: "Kalman filter formulation of low-level television image motion estimation", pp. 169-204, voir p. 174, lignes 10-19; FIG. 2.

Computer Vision, Graphics and Image Processing, vol. 21, No. 2, Feb. 1983, Academic Press Inc. (New York, US), M. Yachida: "Determining velocity maps by spatio-temporal neighborhoods from image sequences", pp. 262-279, voir p. 268, ligne 28-p. 269, ligne 6; FIG. 7.

Primary Examiner—Victor R. Kostak
Attorney, Agent, or Firm—Oblon, Spivak, McCelland, Maier & Neustadt

[57] ABSTRACT

The process consists in estimating motion by execution of a gradient algorithm (2, 3) which brings to a minimum the mean square deviation of the local variations of the current point of the image with the point that is homologous to it in the preceding image, in initializing (7) the execution of the algorithm by the displacement values estimated in several directions within the close vicinity of the current point and by an initial vector of temporal prediction of the displacement between successive frames of the image, then in propagating each estimation in the direction of scanning of the lines of the image.

38 Claims, 18 Drawing Sheets

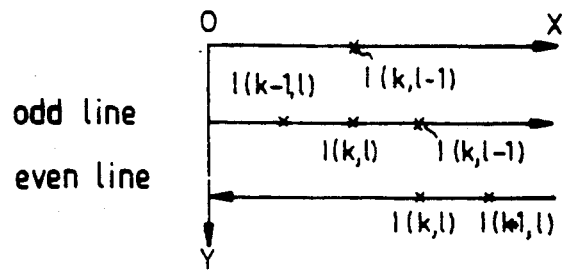
FIG. 5
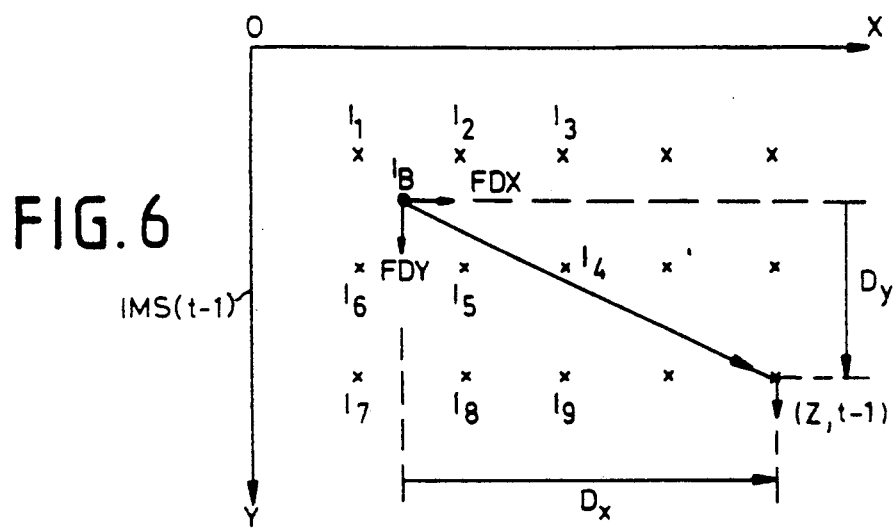
FIG. 6
FIG. 7
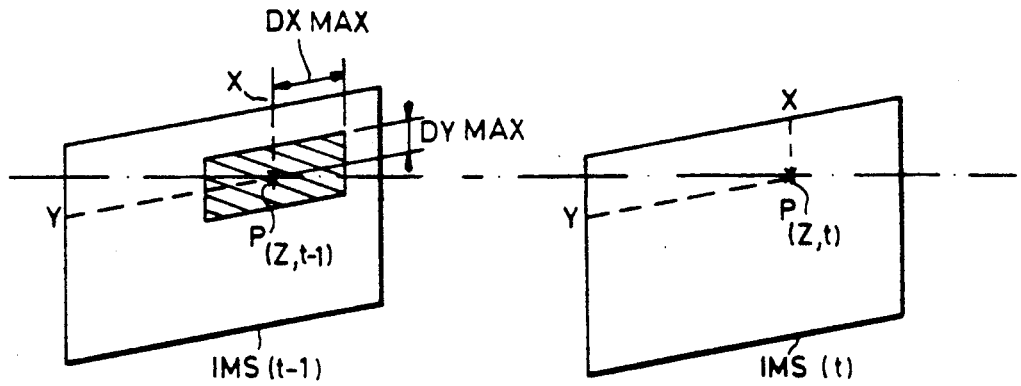

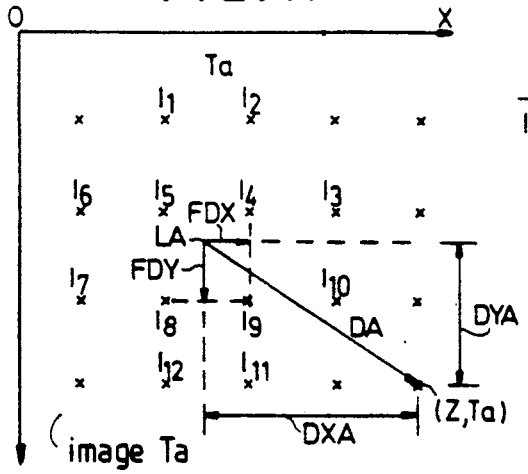
FIG. 11
FIG. 12
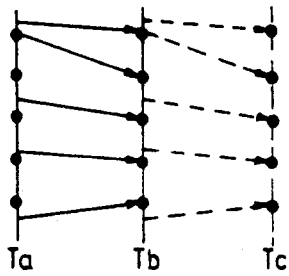
FIG. 13a
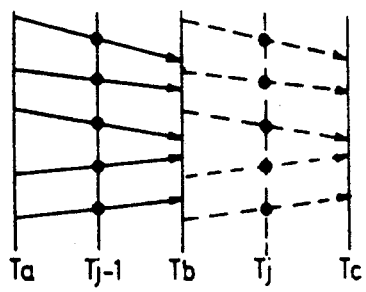
FIG. 13b
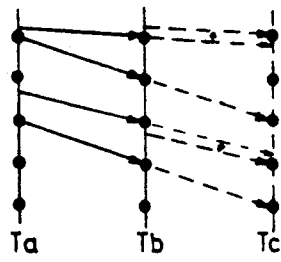
FIG. 13c
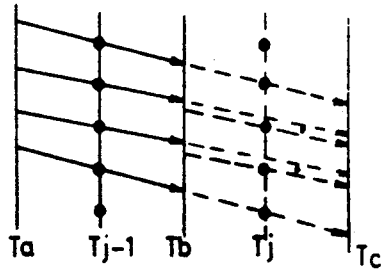
FIG. 13d
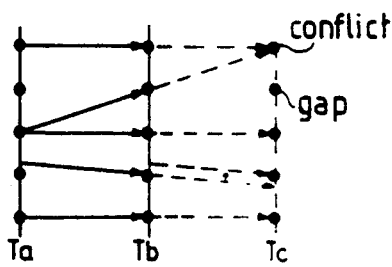
FIG. 13e
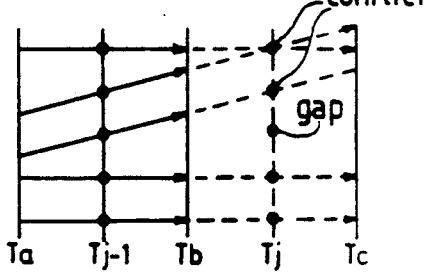
FIG. 13f

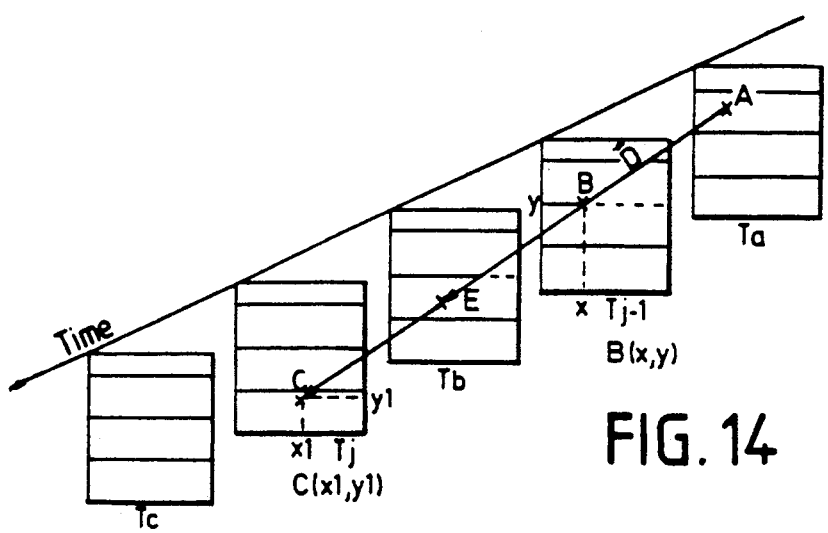
FIG. 14
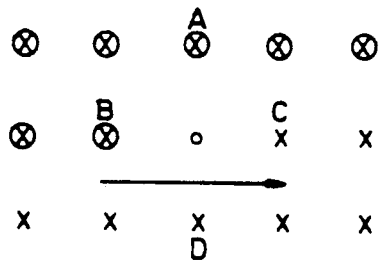
FIG. 15a
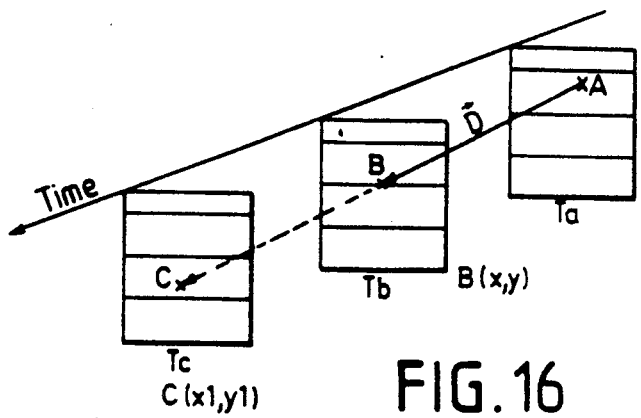
FIG. 16
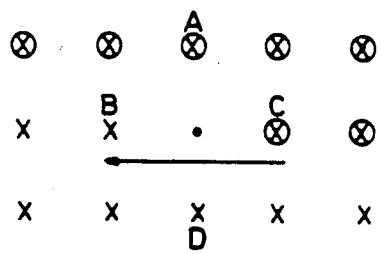
FIG. 15b
FIG. 19
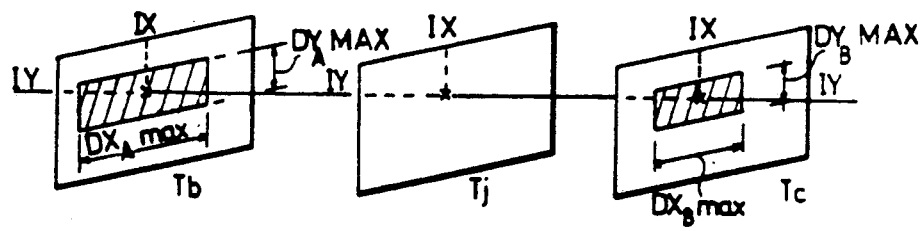

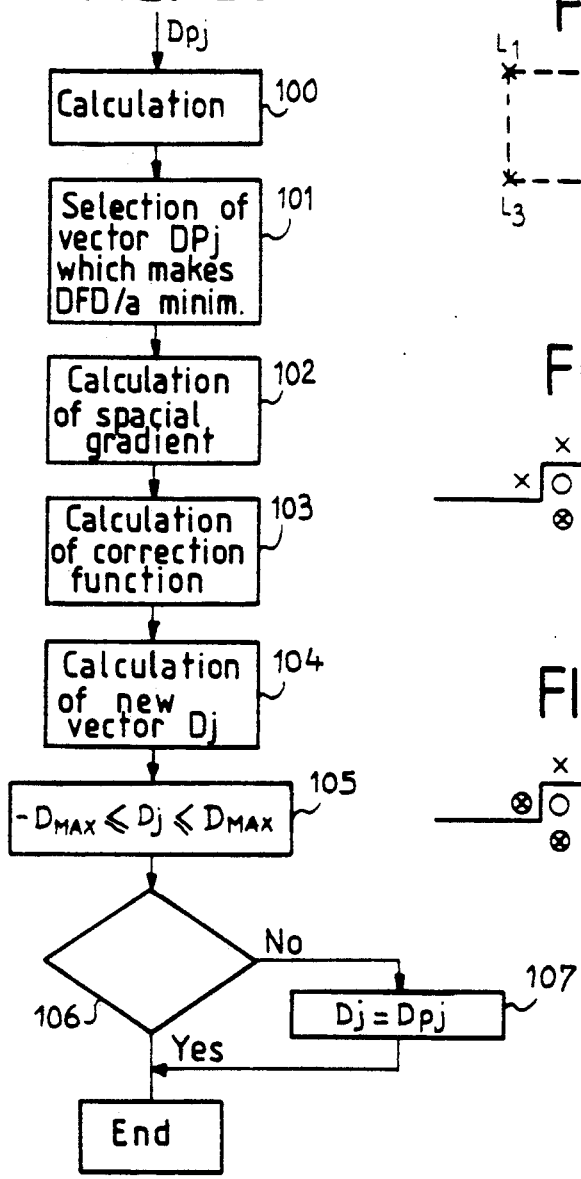
FIG. 28
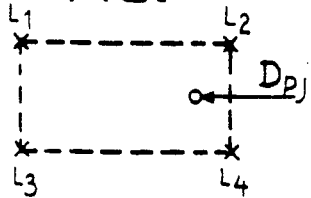
FIG. 29
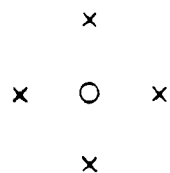
FIG. 30
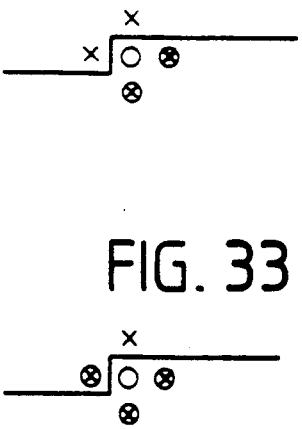
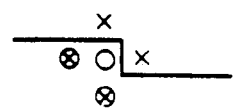
FIG. 31
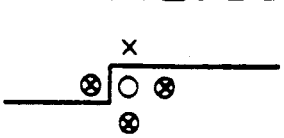
FIG. 32
FIG. 33
FIG. 34
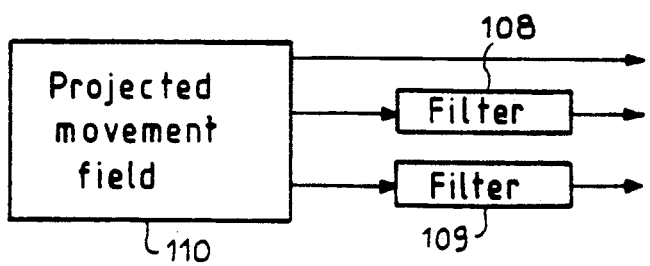
FIG. 35

METHOD AND DEVICE FOR THE ESTIMATION OF MOTION IN A SEQUENCE OF MOVING IMAGES

BACKGROUND OF THE INVENTION

1. Field of the Invention

The invention relates to a method and a device for estimating motion in a sequence of moving images.

It is applied notably to making digital television systems and to reducing the rate of flow of data circulating in these systems.

2. Background Discussion

To estimate the motion or the displacement of points animating a sequence of images, known procedures consist in either matching the characteristic features of the images or using a differential estimation method that uses the spatial and temporal gradients of the representative points. However, in the latter case, it is difficult to master the initialization of the gradient algorithms used. For example, according to a first method, a known procedure lies in tracking the course of a number of characteristic points (angular points, curves etc.) over time to estimate their motion and initialize a gradient algorithm but, in this case, it is essential, before carrying out this tracking procedure, to resolve the problems of extracting and matching the angular points. This is a laborious process giving results that are as yet far from perfect.

Another known procedure, according to a second method, consists in bringing the mean square deviation of the local variations in inter-image luminance and, possibly, inter-frame luminance to the minimum and in then initializing the gradient algorithm by estimating the motion at the point preceding the current point on the same line. In this case, the convergence of the algorithm depends largely on the initialization stage used, and this stage is generally conducted in taking into account only those parameters defined in the immediate space-causal vicinity of the current point. Thus the field motions for each pair of images are computed independently, without having regard to the fact that these fields are necessarily inter-related from one image to the next.

SUMMARY OF THE INVENTION

It is an object of the invention to mitigate the above-described disadvantages.

To this effect, an object of the invention is a method for estimating motion in a sequence of television type moving images wherein each image is formed by a determined number of luminous points located at the intersection of lines and columns, of the type wherein estimation of motion is obtained by execution of a gradient algorithm which minimizes the mean square deviation of local variations in luminance of the current point of the image with respect to the point homologous with it in the preceding image, the algorithm is initialized on the basis of vectors of displacements estimated in several directions within the close causal vicinity of current point, and each estimtion is propagated in the direction of the scanning of the lines of the image, characterized in that the algorithm is initialized also by means of an initial temporal prediction vector defined for each current point of an image frame by the displacement vector of a point in the preceding frame for which the projection point in the direction of the displacement vector is the closest to the current point.

The invention also concerns a device for the implementation of the method described above.

The method and the device according to the invention have, as their main advantage, the fact that, by virtue of the additional use of a temporal initialization vector, they enable an increase in the speed of convergence of the gradient algorithm. The displacement estimation obtained as a result enables better temporal interpolation since there is continuity in the displacement fields. The risks of false estimations, which lead to visually very disturbing "jumps" of images are thus restricted.

BRIEF DESCRIPTION OF THE DRAWINGS

Other characteristics and advantages of the invention will appear from the following description, made with reference to the appended drawings, wherein:

FIG. 5 is a view to illustrate the mode of computation of the gradient point used according to a first type of displacement estimation according to the invention;

FIG. 6 is a view showing a displacement in an image preceding the current image;

FIG. 7 represents an exploration zone;

FIG. 11 is a view to illustrate a computation of a displaced frame difference and luminance gradient used in the second type of displacement estimation according to the invention;

FIG. 12 represents a zone which is the location of the end of the displacement vector for a current point (1X, 1Y, Tj) in a frame Ta, corresponding to the second type of displacement estimation;

FIGS. 13a to 13f are diagrams to illustrate various types of displacement between successive frames Ta and Tb, the mode of definition of the field of prediction of the motion between Tb and Tc for the two types of estimation and the cases of the appearance of gaps and conflicts in the field of the prediction in the course of the temporal prediction;

FIG. 14 is an exploded view showing a set of imaginary images interposed in successive frames Ta, Tb and Tc, to illustrate the temporal prediction method used in the second type of displacement estimation according to the invention;

FIGS. 15a and 15b are two views to illustrate the steps of the method according to the invention enabling the processing of the gaps as a function of the scanning;

FIG. 16 is an exploded view of three successive frames Ta, Tb and Tc, to illustrate the temporal prediction method implemented in the first type of displacement estimation according to the invention;

FIG. 19 is an exploded view show determination of a displacement window within two frames framing an imaginary frame corresponding to the second type of displacement estimation according to the invention;

FIG. 28 shows a variant of the method for the computation of further displacements in the form of an operational chart;

FIG. 29 is a view to illustrate a variant of the computation of the gradient of the displacement vector end point in a current frame;

FIGS. 30 to 34 are views to illustrate two possible variants concerning the treatment of gaps with temporal prediction, described as above;

FIG. 35 shows a device for filtering the projected motion field, before estimation of the motion of the current image.

DETAILED DESCRIPTION OF THE PREFERRED EMBODIMENTS

Figure 1A:
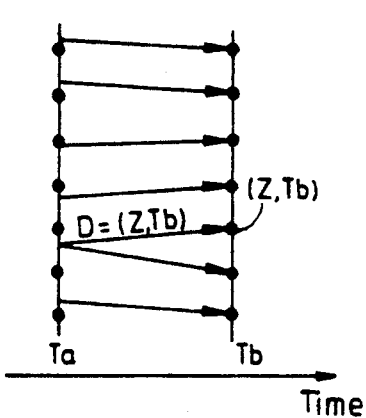
FIGS. 1a and 1b show two diagrams to illustrate two types of estimation of motion used by the invention.

The method according to the invention which is described below is based on the use of a displacement estimatio algorithm of the type described in an article in the publication "Bell System Technology", vol. 58, pages 631 to 670 of March 1979, Part 1, entitled "Motion-Compensated Television Coding" by A. N. Netravali and J. D. Robbins. The gradient algorithm developed therein reduces to the minimum the mean square deviation of the local luminance variations of each current point of a television image between the current point and the point homologous to it in the preceding image.

The expression of this algorithm is defined by a relationship in the form:

$$-D_i(z,t) = D_{i-1}(z,t) - \epsilon.DFD(z,D_{i-1}).\text{grad } I(z-D_{i-1},t-T) \quad (1)$$

where $z(x,y)$ represents the spatial coordinates of the current point $P(z,t)$ in terms of its position located in the plane $(x,y)$ of the image;

$I(z,t)$ is the luminance of the current point $P(z,t)$ at the instant $t$;

$D_i(z,t)$ is the displacement estimated at the point $P(z,t)$ at iteration $i$ and $DFD(z,D)$ designates the displaced frame difference, with this difference verifying the relationship:

$$DFD(z,D) = I(z,t) - I(z-D, t-T) \quad (2)$$

where:

T designates the image period or the frame period;

grad $I(z,t)$ designates the gradient vector of the current point $P(z,t)$ and $\epsilon$ designates the gain of the algorithm.

To improve the speed and precision of convergence of the algorithm, e is defined by the relationship:

$$\epsilon = 1.|\text{grad } I(z-D_{i-1},t-1)|^2 \quad (3)$$

where $$|\text{grad } I(z-D_{i-1},t-1)|^2 = \text{grad}^2_x I(z-D_{i-1},t-1) + \text{grad}^2_y I(z-D_{i-1},t-1) \quad (4)$$

with the condition that if $$|\text{grad } I(z-D_{i-1},t-1)|^2 = 0, \text{ then } \epsilon = 0 \quad (5)$$

Relationship (3) brings out the fact that the greater the gradient, the more the displacement correction term estimated at the preceding iteration decreases. To estimate the motion, the method according to the invention uses the existing inter-frame differences between the two image frames Ta and Tb in a sequence of images, the unit of time considered being the image period, the frames Ta and Tb being subsequently designated by the moments at which they were taken.

According to a first embodiment of the invention, the movement is estimated, in the manner shown in FIG. 1a, between two frames Ta or Tb on the basis of the points of Ta and Tb for the pixels of one of the two frames Ta or Tb (Tb in FIG. 1a). The field of motion obtained is hence attributed to frame Ta or frame Tb (Tb in FIG. 1a). Depending on whether the motion is estimated in frame Ta or in frame Tb, the displacement vector $D_e$ of each pixel with horizontal and vertical luminance components 1X and 1Y is defined by relationships of the form:

$$D_e(IX,IY,Ta) = DX, DY$$

or $$D_e(IX,IY,Tb) = DX, DY$$

Considering, for example, that each current point $P(z,Tb)$ is in the frame Tb, each displacement vector $D_e(z,Tb)$ of a current point in the frame Tb has one end pivoting on a pixel of the frame Tb and one free starting end in the frame Ta. In this context, if the motions of the points of a frame Tj located temporally between the frames Ta and Tb are to be interpolated, the displacement vector fields $D_e(z, Tb)$ are associated with the pixels of the frame Tj and an interpolation computation makes it possible, $D_e(z,Tb)$ being known, to define $D(z,Tj)$.

Figure 1B:
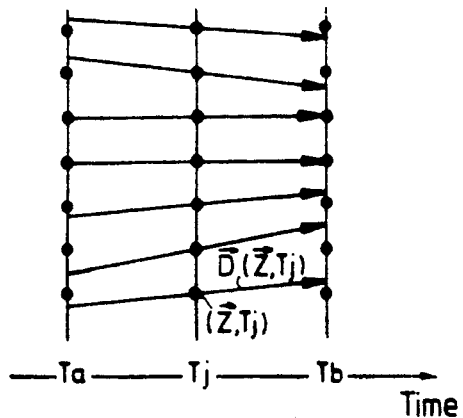

According to a second embodiment of the invention, the motion is estimated between the frames Ta and Tb directly, for each point with luminance components (1X, 1Y) of an imaginary intermediate frame Tj. Having available the displacement vector D of each pixel with coordinates (1X, 1Y, Tj) in the frame Tj, the interpolation method then gives the reconstruction values for each point (1X, 1Y, Tj) of the frame Tj without requiring an additional step for associating motion with the frame Tj. However, if several frames Tj are interpolated between the frames Ta and Tb, this procedure rapidly becomes very costly in terms of in that it requires an estimation of the motion between each frame Ta and Tb for each of the images Tj; it could then be preferable to decide in favor of the first type of estimation indicated above. According to the second embodiment of the invention, the displacement vector D(Z,Tj) of each pixel P(z,Tj) pivots, then, around its pixel and has its ends plotted on frames Ta and Tb respectively; a representation of this variant is shown in FIG. 1b.

This configuration enables the use of the motion field obtained by motion estimators including a frame interpolator adapted to the motion.

It should be noted that, for both variants, the frames Ta, Tb and Tj (Tj being present only in the second variant) may be of either even or odd parity; the even frames are simply offset vertically by one half-line with respect to the odd frames (and temporally by one half image period): the line 1 of the even frame is equidistant from the lines 1 and 1+1 of the odd frame. This has to be taken into account when matching the two frames by suitable addressing.

Figure 2:
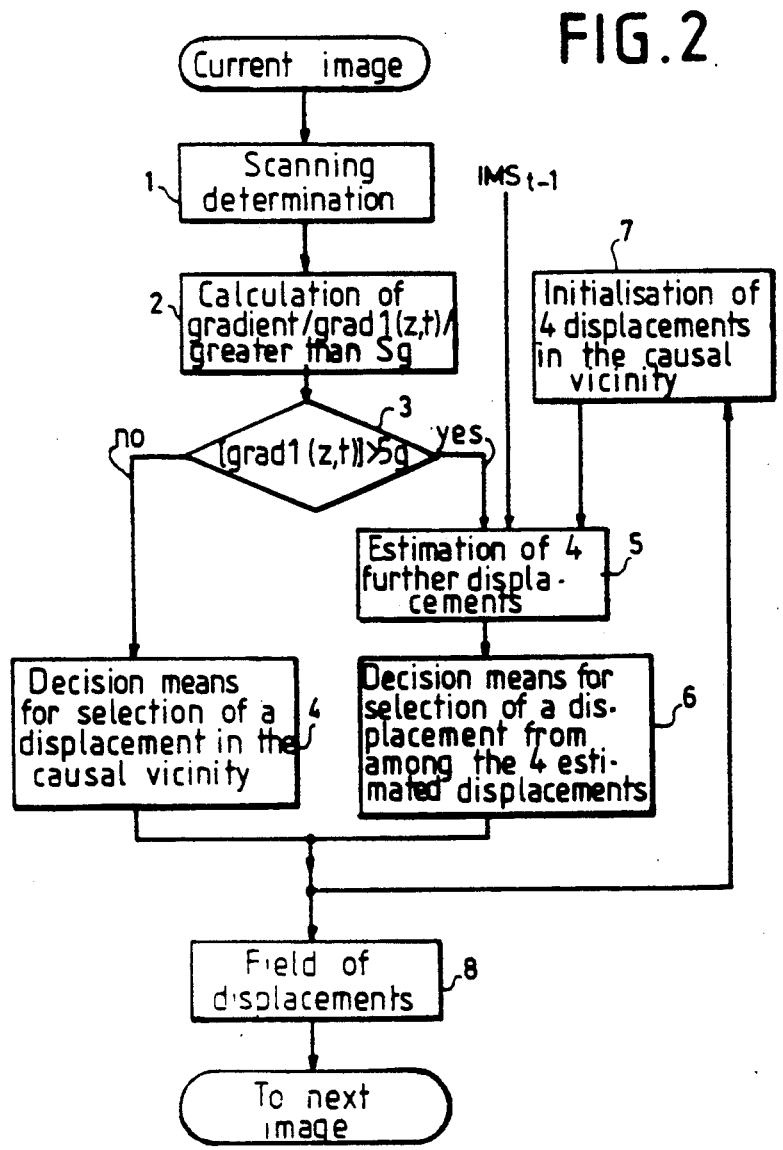
FIG. 2 is an operational chart to illustrate the first type of displacement estimation used by the invention.

The steps of the method corresponding to the first embodiment are shown in FIG. 2. According to a first step shown at 1 in FIG. 2, each current frame IMS(t) (Tb) is analyzed point by point by scanning each line. The luminance gradient of each current point of coordinates $z=(x,y)$ in the plane of the image is computed in Step 2, its absolute value is compared in step 3 with a determined reference threshold value Sg. If the value of the gradient found in step 3 is smaller than the threshold Sg, then the method consists in executing step 4 which consists in selecting a displacement in the causal vicinity of the current point P(z,t). On the other hand if, in step 3, the value of the gradient found is greater than the threshold Sg, the method consists in executing the processing operations indicated in step 5 to estimate four further displacements on the basis of four initial displacement values in the causal vicinity of the current point. At the end of the execution of step 5, the method goes on to the execution of step 6 and a displacement is selected from among the four displacements which were estimated in step 5. Thus, the method runs its course by successive iterations, each end of execution of steps 4 or 6 leading at step 7 to the initialization of the following point and the displacements are recorded at step 8.

Figure 3:
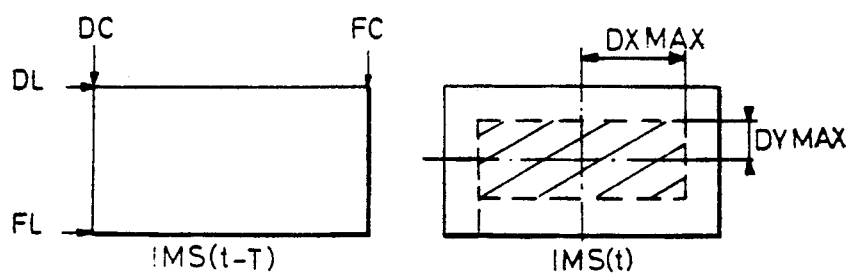
FIG. 3 represents an estimation and exploration zone.

The estimated displacement is limited in the image in lines and columns to within a rectangle with coordinates $\pm DX_{MAX}$ and $+DY_{MAX}$ with respect to the current point. The zone of estimation of the motion in the current image Tb is limited in the manner shown in FIG. 3 by the maximum displacement values $DY_{MAX}$ and $DY_{MAX}$ in the horizontal direction X and the vertical direction Y of the image. The search for the displaced point takes place throughout the preceding image (Ta).

If a displacement vector is estimated for all the pixels of Tb, including the edges, a test can be added to verify that the mobile end of the vector is indeed located on the instant Ta frame. If this is not the case, it is a simple matter to change this vector so as to have, for the current pixel, a new vector, the closest to the old one, which has its mobile end on Ta, so as to be able to estimate the functions DFD and gradL.

Each point of Tb, except the points outside the above-defined window, has a local window for searching for the vector end on Ta which is centered on the current point, the horizontal and vertical dimensions of the window being $2DY_{MAX}$ and $2DY_{MAX}$ respectively.

The displacements that were estimated in the nearest causal vicinity of the current point are used for the initialization of the motion estimation algorithm. This causal vicinity contains four displacements which are used for the initialization of four motion estimations in parallel.

Figure 4A:
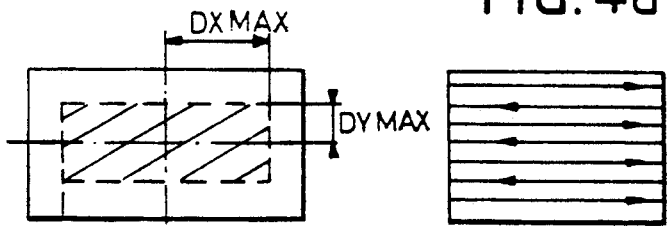
FIGS. 4a, 4b and 4c are three views to illustrate the direction of propagation of the displacement estimation in a frame and the determination of the initial values for the odd and even lines respectively.
Figure 4B:
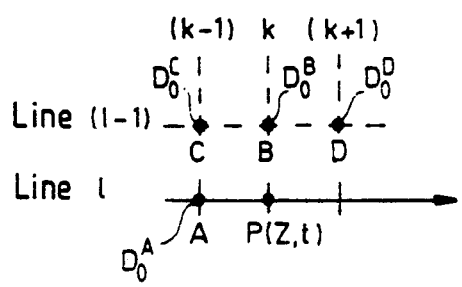
Figure 4C:
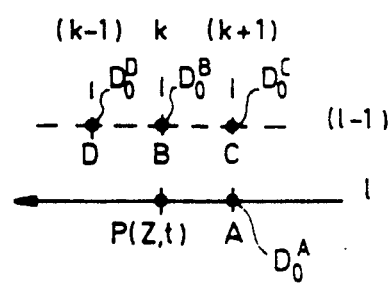

Estimation propagation ensues in the normal method for scanning television images. However, to avoid favoring one direction of propagation in the image, for example from left to right, the direction of scanning is reversed alternately every second line. A representation of this scanning in alternate even and odd lines is given in FIG. 4a and the initial values $D^A$, $D^B$, $D^C$ and $D^D$ for the odd and even lines are represented in FIGS. 4b and 4c respectively.

Following the representation of FIG. 5, the computation of the gradient in the current image is done at the current point P(z,t) following the scanning of the current line. Since this computation respects causality, it varies according to the direction of scanning. For an odd line, the gradient verifies the relationship:

$$\text{grad}_x = I(k,l) - I(k-1,l); \quad \text{grad}_y = I(k,l) - I(k,l-1) \tag{8}$$

and, for an even line, the gradient verifies the relationship:

$$\text{grad}_x = I(k+1,l) - I(k,l); \quad \text{grad}_y = I(k,l) - I(k,l-1) \tag{9}$$

with $$|\text{grad } I(z,t)| = (\text{grad}^2_x + \text{grad}^2_y)^{\frac{1}{2}} \tag{10}$$

Since the base algorithm used is a gradient algorithm, no iteration (further displacement estimation) is carried out in low gradient zones. The threshold Sg is the threshold used on the modulus of the current gradient.

To carry out the interpolation and the computation of the gradients in the preceding image, each displacement $D=(D_x,D_y)$ is broken down according to its two components $D_x$ and $D_y$ according to the relationships: $D_x = ID_x + FD_x$ and $D_y = ID_y + FD_y$, where ID and FD designate the integer and decimal parts of the displacement.

The unit of the displacement in X is formed by the interval between two points on the same line and the unit of displacement in Y is formed by the interval between two lines on the same frame. For their part, the gradients are computed according to the known method described in the IEEE article "Movement-Compensated Inter-Frame Prediction for NTSC Color TV Signals", by S. Sabri. A graphic representation of these computations is shown in FIG. 6 which shows the displacements in the preceding image IMS(t-1).

The luminance $I_B$ of the displaced current point in the preceding image is obtained by bilinear interpolation of luminances $I_n$ of the adjacent points, which is rendered, with references as in FIG. 6, by the relationship:

$$I_B = I_5.(1-FD_x).(1-FD_y) + I_6.FD_x.(1-FD_y) + I_2.(1-FD_x).FD_y + I_1.FD_x.FD_y \tag{11}$$

The horizontal gradient is:

$$I_x = (I_5 - I_6 + I_2 - I_1)/2 \tag{12}$$

The vertical gradient is $$I_y = (I_5 - I_2 + I_6 - I_1)/2 \quad (13)$$
$$\text{if } FD_x = 0: I_x = (I_4 - I_6 + I_3 - I_1)/4 \quad (14)$$
$$I_y = (I_5 - I_2) \quad (15)$$
$$\text{if } FD_y = 0 \quad I_x = (I_5 - I_6) \quad (16)$$
$$I_y = (I_7 - I_1 + I_8 - I_2)/4 \quad (17)$$
$$\text{if } FD_x = 0 \text{ et } FD_y = 0$$
$$I_x = (I_4 - I_6 + I_3 - I_1)/4 \quad (18)$$
$$I_y = (I_7 - I_1 + I_8 - I_2)/4 \quad (19)$$

To limit the risks of divergence or of cancellation of the correction terms, they are increased and decreased. We have:

$$D_i^x = D_{i-1}^x \text{ (correction term)}^x \quad (20)$$

$$D_i^y = D_{i-1}^y \text{ (correction term)}^y \quad (21)$$

$$\text{(correction term)}^x = DFD(z, D_{i-1}) \cdot \text{grad}_x I(z - D_{i-1}, t - 1). \quad (22)$$

$$\text{(correction term)}^y = DFD(z, D_{i-1}) \cdot \text{grad}_y I(z - D_{i-1}, t - 1). \quad (23)$$

Calculating the gradient in the preceding image with a maximum precision of 0.25 we obtain, on the basis of relationship (3):

$$\epsilon_{MAX} = 8 \quad (24)$$

Generally, $FD_X$ and $FD_Y$ are not equal to zero, and the maximum precision on the gradient is 0.5. We then get:

$$\epsilon_{MAX} = 2.$$

According to one possible embodiment of the invention, limitation tests of the correction terms expressed in units of displacement could be defined if applicable in the following manner:

1. If $|\text{(correction term)}| < 1/16$, then (correction term) will be taken as equal to $\pm 1/16$.
2. If $|\text{(correction term)}| > 3$, then (correction term) will be taken as equal to $\pm 3$.

If $|\text{(correction term)}^y| > 2$, then (correction term)$^y$ will be taken as equal to $\pm 2$.

In this embodiment, it will also be possible to take as the maximum displacement in X, for example: $D^x_{MAX} = \pm 15$ and as the maximum displacement for Y: $D^y_{MAX} = \pm 5$.

If the estimated displacement exceeds one or other of these values, it is returned to zero.

Under these conditions, the zone of searching in a frame of the image IMS(t-1) for a current point P(z,t) is defined in a rectangle measuring 30x10, as shown in FIG. 7.

The four displacement estimations are conducted in parallel on the basis of the four initial values $D^A_0$, $D^B_0$, $D^C_0$ and $D^D_0$. A point is considered as convergent if at least one of the four displacement values $D^A_i$, $D^B_i$, $D^C_i$ and $D^D_i$ gives an absolute value for displaced frame difference DFD(z, $D_i$) below the threshold S defined previously for an iteration number i greater than or equal to zero (i=0 designates an initial value) and less than or equal to the maximum iteration number $i_{MAX}$ ($0 < i < i_{MAX}$). If no displacement value gives a value $|DFD|$ less than or equal to S, then the point is regarded as divergent, but a displacement is nonetheless attributed to it—that which, out of $$D^A_{iMAX}, D^B_{iMAX}, D^C_{iMAX}, D^D_{iMAX}$$

gives the lowest absolute value of $|DFD|$.

If the gradient of the current image is low, the selection of a displacement is made in the causal vicinity of the current point P(z,t) and no iteration is carried out (i=0). The decision criterion then consists in selecting that displacement which, of the values $$D^A_0, D^B_0, D^C_0 \text{ and } D^D_0$$

gives the lowest absolute value for the displaced frame difference (DFD(z,$D_0$)). In the case of equal values, the selection is made in the order $$D^A_0, D^B_0, D^C_0 \text{ and } D^D_0$$

Figure 8:
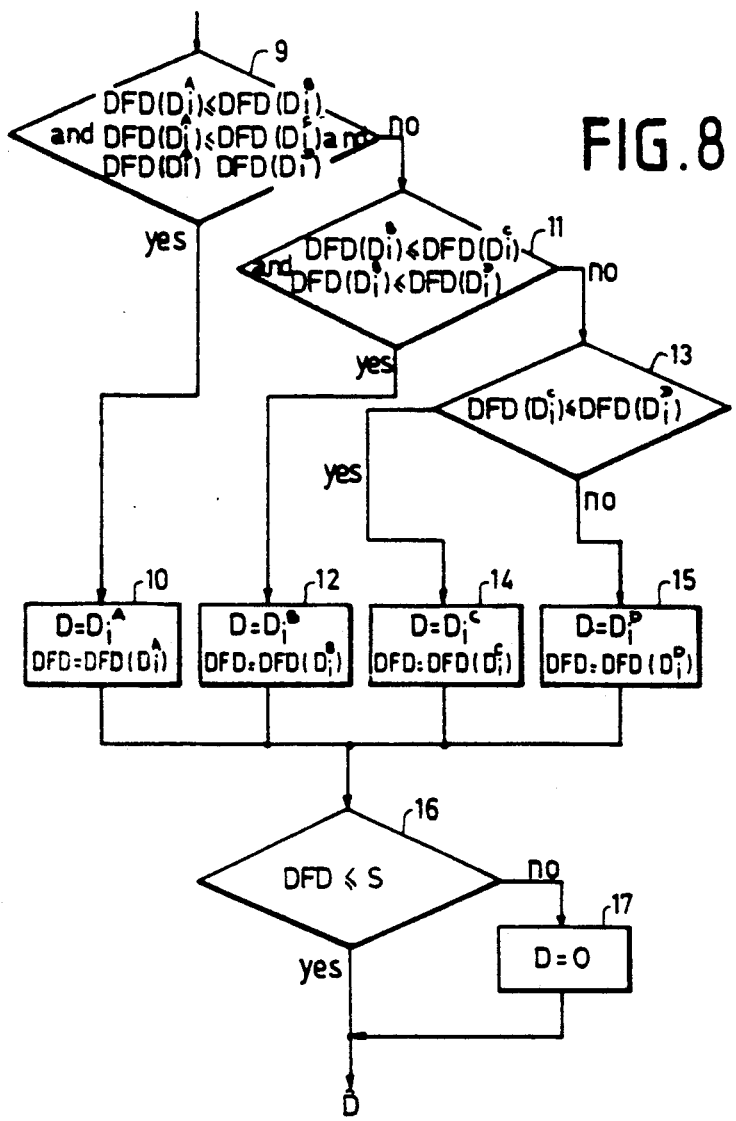
FIG. 8 is an operational chart to illustrate a decision algorithm used in the first type of displacement estimation according to the invention.

(steps 9 to 15 in FIG. 8). However, if the displaced displaced frame difference of the displacements selected is not less than or equal to the threshold S (step 16) (convergence test threshold) the displacement takes the value 0 (step 17).

If the gradient of the current image is high, at each iteration (from 0 to $i_{MAX}$), four values of $|DFD(D_1)|$ are obtained, and these are compared with threshold S.

The displacement adopted is the first which gives a $|DFD|$ less than or equal to the threshold S. If several displacements are obtained on the same iteration, the displacement which gives the lowest displaced frame difference $|DFD|$ is selected. In the event of equal values occurring again for $|DFD|$, an arbitrary selection is made in the sequence:

$$D^A_i, D^B_i, D^C_i, D^D_i.$$

Thus, with each iteration i ($0 \leq i \leq iMAX$), there is associated a displacement $D_i$, a displaced frame difference DFD and an iteration number i.

The decision, then, is taken on the lowest number of iterations, then on the minimum displaced frame difference DFD, after which an arbitrary selection is made, if applicable.

Figure 9:
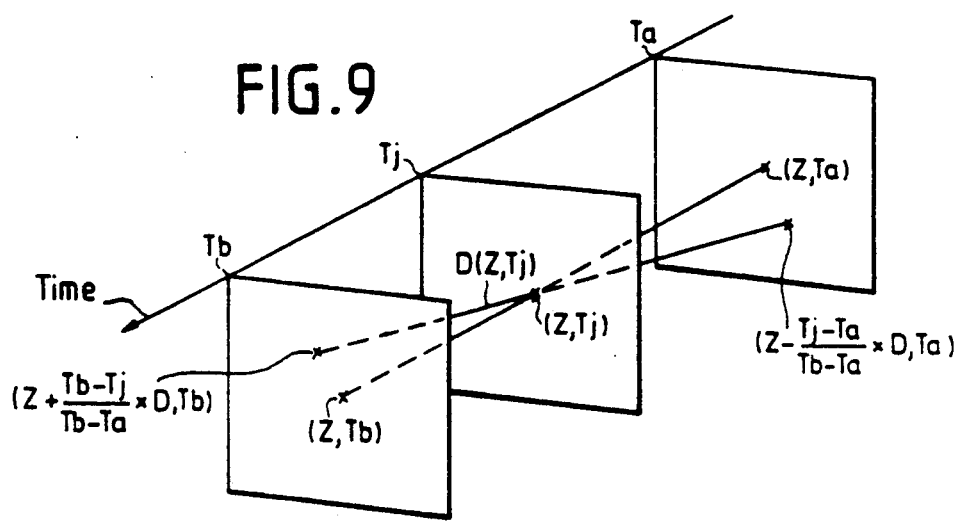
FIG. 9 is an exploded view to illustrate an application of the method according to the invention to an inter-frame operating mode according to a second type of displacement estimation.

According to the second embodiment of the invention, the method allows the determination of a motion field between two, generally successive, frames of a sequence of images, in the form of a vector field attributed to an imaginary frame, generally located between two parent frames. The motion field is made up of a set of vectors. Each vector goes through a pixel of the imaginary frame and has its ends on the two parent frames surrounding it. In FIG. 9, the parent frames are designated by the instant at which they are taken Ta and Tb. The imaginary frame is located at an intermediate instant Tj between instants Ta and Tb. The objective is to provide a displacement vector at each pixel of the imaginary frame considered at instant Tj, with the luminance of each pixel being a priori unknown, on the basis of the luminance field of the frames of instants Ta and Tb. According to another embodiment of the invention, it will also be possible to consider that the instant Tj can also be located outside the interval (Ta, Tb).

This method is similar to the method described above in connection with the first embodiment of the invention, but with the difference that it enables the motion between two frames of instants Ta or Tb to be estimated for the pixels of the imaginary frame Tj. The complexities of the algorithm and the complexity of the estimation device which result therefrom are of the same order of magnitude.

The motion estimation is computed on the basis of the luminance L() of the pixels of the frames of instants Ta and Tb. The motion estimated for each pixel is presented in the form of a vector D with two components—a horizontal component DX and a vertical component DY.

D designates the displacement between Ta and Tb of the pixel with coordinates (z, Tj) in the imaginary frame Tj, z represents the pair of coordinates, horizontal IX and vertical IY, of the pixel in the imaginary frame Tj. In the present case, the displacement vector D goes through the point (z, Tj) and has its ends on the frames Ta and Tb, whereas in the previous case the displacement vector (D(z,Tb) corresponds to the displacement of the pixel with coordinates (z, Tb) between the frames Ta and Tb. This difference has consequences for the definition of the base equation (1).

This equation becomes $$D_i(z,Tj)=D_{i-1}(z,Tj)-TC \quad (24)$$

with $$TC=(DFD(z,D_{i-1}).\text{grad } L(z,D_{i-1}))/2.(\text{grad } L(z,D_{i-1}))^2 \quad (25)$$

in which:

z is a vector that designates the spatial coordinates of the current point P(z,Tj) for which the displacement vector D(z,Tj) is estimated, $D_i(z,Tj)$ is the displacement vector estimated at the point P(z,Tj) at the iteration i, $DFD(z,D_{i-1})$ designates the temporal difference in luminance in the direction of the displacement $D_{i-1}$; it is also called a displaced frame difference and is computed between Tz and Tb according to the relationship:

$$DFD(z,D_{i-1})=L(B, Tb)-L(A,Ta)$$

with $$B=z+((Tb-Tj)/(Tb-Ta))xD_{i-1}$$

$$A=z-((Tj-Ta)/(Tb-Ta))xD_{i-1}$$

grad $L(z,D_{i-1})$ is a vector that designates the spatial gradient of luminance L in the direction of the displacement $D_{i-1}$. This vector is equal to the half sum of the spatial gradients at the ends of $D_{i-1}$, on Ta and Tb; its value is defined by: 2 grad $L(z,D_{i-1})$=grad $L(A,Ta)$+- grad $L(B,Tb)$. There is little difference when equation (1) is compared with equation (24) above. However, the equation does differ in the computation of the functions DFD and grad L, since the motion vector pivots around the pixel (z, Tj) and, consequently, its ends on the frames of instants Ta and Tb vary whereas, in the previous case, the vector pivoted by one end around the pixel P(z,Tb) and had its other, free end on the frame of instant Ta. As a result, the advantages obtained by the preceding estimation are kept. Similarly, as regards the context in which the base equation is used, the strategies that still have meaning in this estimator are retained. These are, in particular, the following:

the estimation of the motion vector for the current point following the recurrences examined, computed in parallel on the basis of four initialization vectors, being the estimated motion vectors of four points adjacent to the current point in the causal vicinity;

the alternation of the direction of scanning of the line in the current frame, frame Tj in the context of this invention, the decision unit as regards the selection of one displacement from among four estimated displacements.

However, the procedure wherein the gradient of the luminance of the current point is compared with a threshold, and wherein two procedures are distinguished according to whether the gradient is greater (strictly) or smaller than this threshold is eliminated. Indeed, this distinction is now meaningless since the luminance of the current frame Tj is unknown. Hence all the points of the imaginary frame Tj follow the same procedures for estimation of the motion vector, according to four recurrences computed in parallel.

Also, the estimation is computed between two frames Ta and Tb which can be of the same or different parities, and for a frame Tj which can also be even or odd. A correction vector, designated as dza or dzb, is introduced into the computation of the functions DFD and grad L: dza depends on the relative parity of Ta and Tj, and dzb depends on the relative parity of Tb and Tj.

The functions DFD and grad L become:

$$DFD=L(B+dzb,Tb)-L(A+dza,Ta) \quad (25)$$

$$2x\text{grad } L(z,D_{i-1})=\text{grad } L(B+dzb,Tb)-\text{grad } L(A+dza,Ta) \quad (26)$$

Should the frame Tj considered be located outside the interval (Ta, Tb) the various equations given above remain unchanged. In this case, the support of the vector D(z,Tj) goes through the point P=(z,Tj) and this point further measures the relative displacement between the frames of instants Ta and Tb.

To estimate the motion, the method uses the existing inter-frame differences between two frames of instants Ta and Tb following each other, immediately or otherwise, in a sequence of images. In the following description, it is assumed that the displacement of each pixel of the imaginary frame of instant Tj is rectilinear between two frames of instants Ta and Tb, and each object element of the imaginary frame of instant Tj (pixel luminance) is assumed to be present also in the frames of instants Ta and Tb.

Figure 10:
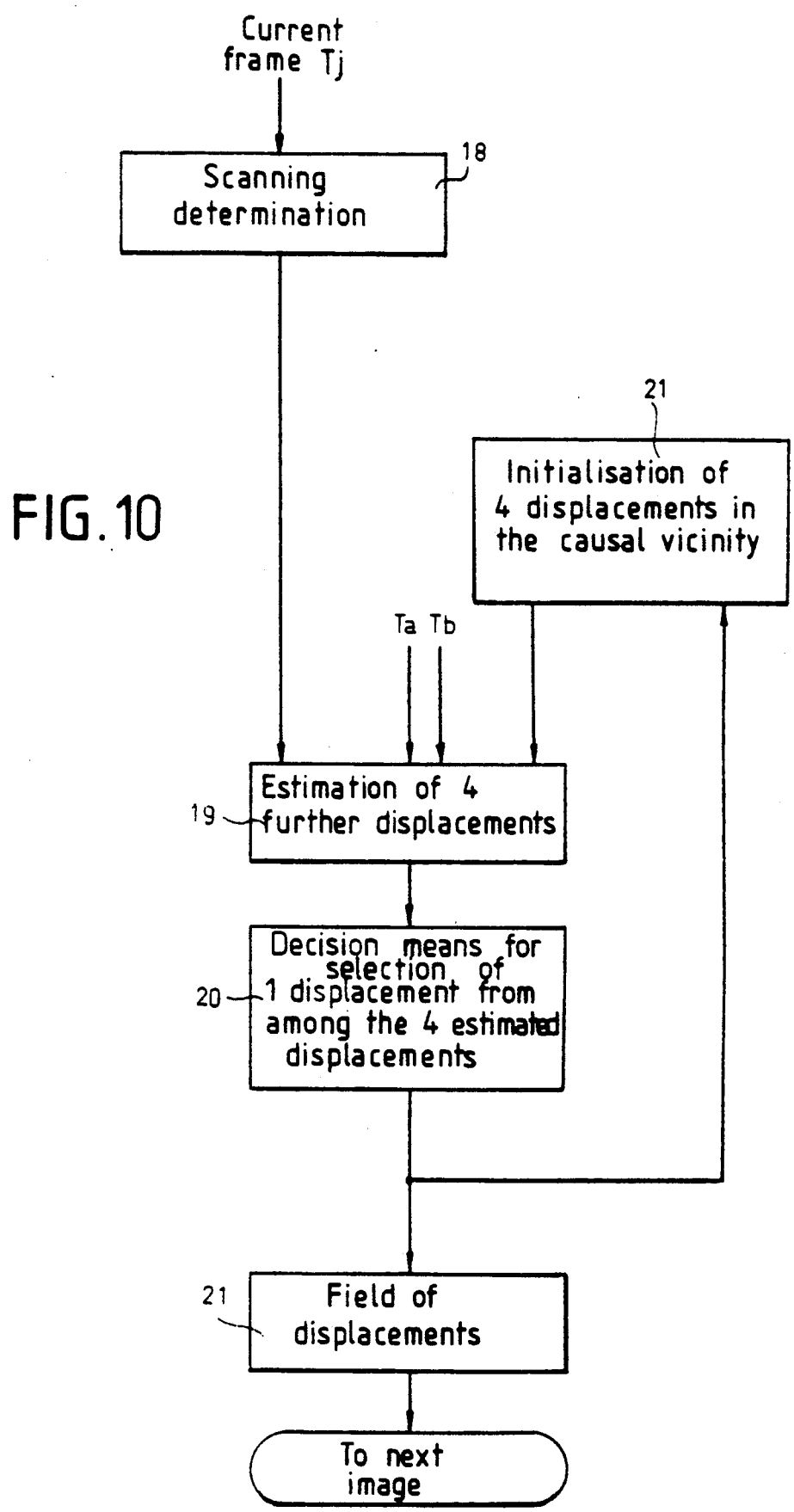
FIG. 10 is an operational chart to illustrate the second type of displacement estimation used by this invention.

The method takes its course according to a number of steps which are represented in the operational chart of FIG. 10. According to a first step, shown at 18, each point of the current frame is analyzed by a linewise scanning of all points of the frame. The method consists in carrying out the processing operations indicated at step 19 to estimate four displacement values on the basis of four initial displacement values in the causal vicinity of the current point. At the end of the execution of step 19, the method proceeds to the execution of step 20 and a displacement is selected from among the four displacements which have been estimated in step 19. The method runs its course in this way, by successive iterations, with each end of execution of step 20 prompting the initialization of the following point (step 21) and the displacements are recorded at step 22.

The displacements that are estimated in the closest causal vicinity of the current point have the function of initializing the motion estimation algorithm. This causal vicinity contains four displacements which are used to initialize four motion estimations in parallel.

In accordance with the case described previously, the direction of scanning is reversed alternately at every second line.

To achieve the interpolation and the computation of the gradients in the preceding frame, each displacement $D=(DX, DY)$ is broken down according to its two components DX and DY according to the relationships:

$DX=IDX+FDX$ and $DY=IDY+FDY$, where ID and FD designate the integer and decimal parts of the displacement respectively.

The unit of the displacement in X is formed by the interval between two points on the same line and the unit of the displacement in Y is formed by the interval between two lines in the same frame.

The gradients are computed in the manner described below, and illustrated by FIG. 11 which represents a portion of the frame of instant Ta, and a displacement vector for which the end on the frame of instant Ta has the coordinates (z-Da,Ta) and luminance LA. The luminance LB of its end in the frame of instant Tb, and the displacement vector DB at this point are computed in the same manner.

In this case, the displacement vectors DA and DB verify the relationships:

$$DA=((Tj-Ta)/(Tb-Ta))xD$$

$$DB=((Tb-Ta)/(Tb-Ta))xD$$

Vectors DA and DB being co-linear and such that $$D=DA+DB$$

The luminance LA of the current point displaced in the frame of instant Ta is obtained by bilinear interpolation of the luminances Ln of the adjacent pixels, which is expressed, with the designations used in FIG. 11, by the relationship:

$$LA=I_9.(1-FDX).(1-FDY)+I_8.FDX.(1-FDY)+I_4(1-FDX).FDY+I_5.FDX.FDY$$

The spatial gradient of luminance G at this point, the components of which are designated GX and GY, are computed as follows:

If FDX is less than 0.2 and if FDY is less than 0.2, then $$GX=(I_{10}-I_8)/2, GY=(I_{11}-I_4)/2$$

or if FDY is greater than 0.8 then $$GX=(I_3-I_5)/2$$

$$GY=(I_9-I_2)/2$$

or is between 0.2 and 0.8 then $$GX=(I_{10}-I_8+I_3-I_5)/4$$

$$GY=(I_9-I_4)$$

If FDX is greater than 0.2 and if FDY is less than 0.2, then $$GX=(I_9-I_7)/2$$

$$GY=(I_{12}-I_5)/2$$

or if FDY is greater than 0.8 then $$GX=(I_4-I_6)/2$$

$$GY=(I_8-I_1)/2$$

or if FDY is between 0.2 and 0.8 then $$GX=(I_9-I_7+I_4-I_6)/4$$

$$GY=(I_8-I_5)$$

finally, if FDX is between 0.2 and 0.8 and if FDY is less than 0.2, then $$GX=(I_9-I_8)$$

$$GY=(I_{11}-I_4=I_{12}-I_5)/4$$

or if FDY is greater than 0.8 then $$GX=(I_4-I_5)$$

$$GY=(I_9-I_2-I_8-I_1)/4$$

or if FDY is between 0.2 and 0.8 then $$GX=(I_4-I_5+I_9-I_8)/2$$

$$GY=(I_9-I_4+I_8-I_5)/2$$

Once the luminances LA and LB of the ends of the vector D on the frame of instants Ta and Tb have been determined, the inter-displaced frame difference is computed by the relationship:

$$DFD(z,D)=LB-LA$$

Similarly, once the spatial gradients GA and GB are determined at the ends of the vector D on the frames Ta and Tb, the gradient grad L(z,D) of the recursive equation (24) is computed by the relationship:

$$2\times \text{grad } L(z,D)=GA+GB$$

As in the previous case, the risks of divergence or cancellation of the correction terms can be limited by increasing and decreasing the correction terms, so that:

$D_i^x = D_{i-1}^x$ - (correction term for $X$)
$D_i^y = D_{i-1}^y$ - (correction term for $Y$)
with
(correction term for $X$) = $DFD(z,D_{i-1}) \times \text{grad}_x(z,D_{i-1}) \times \epsilon$
and
(correction term for $Y$) = $DFD(z,D_{i-1}) \times \text{grad}_y(z,D_{i-1}) \times \epsilon$
with $\epsilon = \frac{1}{2} \times |\text{grad } L(z,D_{i-1})|^2$ and
$|\text{grad } L(Z,D_{i-1})|^2 = \text{grad}_x^2 L(Z,D_{i-1}) + \text{grad}_y^2 L(Z,D_{i-1})$ $|\text{grad } L(Z,D_{i-1})|^2 = \text{grad}^2_xL(Z,D_{i-1})+\text{grad}^2yL(Z,D_{i-1})$ with the condition that if $(\text{grad } L(z,D_{i-1}))^2=0$ then the value of $\epsilon$ is zero.

As in the preceding case of limitation tests, correction terms expressed in displacement units can be defined as follows:

1. If the absolute value of (correction term) is less than 1/16, then the (correction term) will be taken as equal to $\pm 1/16$.

2. If the absolute value of (correction term for x) is greater than 3, then the (correction term for x) will be taken as equal to ±3.

3. If the absolute value of (correction term for y) is greater than 2, then the (correction term for y) will be taken as equal to ±2.

We may also take as an example, in the case of two successive frames, a maximum displacement in x: DXMAX = ±8 columns, and a maximum displacement in y: DYMAX = ±4 lines.

If the estimated displacement exceeds one or other of these values, it is returned to zero.

The maximum displacement DMAX between the frames of instants Ta and Tb can be broken down into DA MAX and DB MAX colinear vectors, the ends of which are on the frames of instants Ta and Tj in the case of DA MAX, and the frames of instants Tb and Tj in the case of DB MAX, such that DMAX = DA MAX + DBMAX. Since DMAX is fixed, DA MAX and DB MAX depend on the distance from the frame of instant Tj to the frames of instants Ta and Tb. The zone of searching, in the frames of instants Ta and Tb, for a current point P(z, Tj) is then defined by a rectangle on each frame Ta and Tb as shown in FIGS. 12 and 19 with the following dimensions respectively:

$$2DA\ MAX = 2 \times (DX\ MAX \times ((Tj - Ta)/Tb - Ta)),$$
$$DY\ MAX \times ((Tj - Ta)/(Tb - Ta))$$
and
$$2DB\ MAX = 2 \times DX\ MAX \times ((Tb - Tj)/Tb - Ta))$$
$$DY\ MAX \times ((Tb - Tj)/(Tb - Ta))$$

If a displacement vector is estimated for all the pixels of the imaginary frame Tj, including the edges, a test can be added to verify that the ends of the vector are in fact located on the frames of instants Ta and Tb. If this is not the case, it is a simple matter to modify this vector so as to have, as the current pixel, a new vector, which is the closest vector to the old one and has its ends on the frames of instants Ta and Tb, so as to make it possible to estimate the functions DFD and grad L.

In accordance with the previous case, the four displacement estimations are made in parallel on the basis of four initial values $D^A{}_0$, $D^B{}_0$, $D^C{}_0$ and $D^D{}_0$. A point is considered as convergent when at least one of the four displacement values $D^A{}_i$, $D^B{}_i$, $D^C{}_i$ and $D^D{}_i$ gives an absolute value for the inter-frame displacement distance DFD(z,Di) below a pre-defined threshold S, for an iteration number i greater than or equal to zero (with i=0 designating an initial value) and less than or equal to the maximum iteration number i MAX. If no displacement value gives a DFD value less than or equal to S, the point is considered to be divergent, but a displacement is nonetheless attributed to it—that displacement which, out of the $D^A{}_{iMAX}$, $D^B{}_{iMAX}$, $D^C{}_{iMAX}$ and $D^D{}_{iMAX}$ gives the lowest absolute value for the displaced frame distance DFD.

At each iteration (from 0 to iMAX), the procedure gives four values of DFD ($D_i$) which are compared with threshold S.

The displacement adopted is the first which gives the DFD value less than or equal to the threshold S. If a number of displacements have a DFD value less than or equal to S at the same iteration, the displacement giving the lowest displaced frame difference DFD is selected. In the event of equal values of DFD occurring again, an arbitrary selection is made in the following sequence:

$D^A{}_i$, $D^B{}_i$, $D^C{}_i$ and $D^D{}_i$.

Thus, associated with each iteration i from the value i=0 up to a value $i_{MAX}$, there is a displacement $D_i$, a displaced frame difference DFD and an iteration number i.

The decision is taken on the smallest number of iterations, then on the displaced frame distance DFD and then, if applicable, according to an arbitrary selection.

To take account of the fact that the motion fields are necessarily inter-related from one image to the next, the above-described methods have to be modified in their initialization stage to introduce an additional temporal displacement vector, the difficulty being, for temporal propagation of the estimation, to find, in the preceding motion field, the displacement which is best suited to the current point where the displacement estimation algorithm is applied.

According to a first method, it is possible to use, as the initial value, the displacement of the point having same spatial coordinates in the preceding estimated motion field, as shown in FIGS. 13a and 13b. However, this displacement is valid only if the displacements from one image to the next one are small and, it is important, for example, not to attribute a false initial value to the current point, since this would have the effect of introducing further imprecision into the motion estimation.

In the case where, according to a second method, the images have large displacements, it is necessary to make a temporal prediction of the current motion field on the basis of the preceding motion field, in the direction of the displacement as shown in FIGS. 13c and 13d. This temporal prediction is then used for the initialization of the displacement estimation.

The first method is of little interest since it can be the source of some imprecision. On the other hand, the temporal initial value is obtained very easily. One only has to read the motion attributed to the point with the same spatial coordinates in a motion memory of the preceding image.

The second method performs better: the estimated displacements between the frames Ta and Tb for the points of an imaginary frame Tj-1 or for the points of the frame Ta or of the frame Tb are projected according to their direction to the following frame, for which it is desired to estimate the motion to the frame Tj or to the frame Tb or Tc respectively, to form the prediction image. In this way, we obtain the initial motion field of temporal prediction which is used for the estimation of the displacement between Tc and Tb for the points of the frame Tj or for the points of the frame Tb or of the frame Tc.

Thus, if Tx designates any of the frames (Tj, Tb or Tc) to which the motion estimation algorithm is applied, the preceding frame Tx-1 contains, by assuumption, a motion field defined by motion vectors with two components (DX and DY) at each of its points. Under these conditions, the motion field is defined for all the points of the frame Tx if there exists, at each point of the frame, a corresponding point in the frame Tx-1. The ideal case is bijection of the points of the frame Tx-1 to those of the frame Tx, with each frame Tx thus having one and only one corresponding point in frame Tx-1.

However, in practice, this configuration is hardly ever found, as shown in FIGS. 13e and 13f: either there is a lack of corresponding points, and there are then gaps in the prediction field, or there are a number of corresponding points, and conflicts appear in the prediction field.

These difficulties are overcome by the invention in the following manner.

In the case where the displacements are estimated between the frames Ta and Tb for the points of an imaginary frame Tj-1 located between Ta and Tb, the process according to the invention consists in defining, for each point of the following imaginary frame T3 between the frame Tb and the following frame Tc, a prediction of the motion vector on the basis of the field of the imaginary frame Tj-1, this motion field being defined by the displacement vectors D=(DX, DY) of each point of the field Tj-1. To this end, as shown in FIG. 4, it is supposed that the motion between the fields Tj-1 and Tj is linear, and each displacement vecto of the frame Tj-1 is extended to the frame Tj, where it creates a point of intersection. There are thus as many points of intersection as there are pixels in the frame Tj-1, with the possibility of confusion between some of them. Each of these points of intersection is thus associated with the motion vector that created it, and hence each point of intersection is the carrier of an item of data giving information on the motion of the points of the frame Tj.

The problem then becomes that of defining what is the motion prediction to be assigned to the pixels of the frame Tj on the basis of the displacement vectors of the points of intersection also located on the frame Tj.

As an example, if we consider, in FIG. 14, the motion field between the frames Ta and Tb for the points of the frame Tj-1, designating as D=(DX,DY) the displacement vector of a point B located on this frame, and adopting the hypothesis that the motion takes place in linear fashion between the frame Ta and the frame Tj, it is possible to consider that the motion of the point B can be attributed to point C, the point of intersection of the displacement vector of point B in the frame Tj.

If the point B has the spatial coordinates (X,Y), the point of impact C has the spatial coordinates:

$$(X_i\ Y_i) = \left[X + \frac{Tj - Tj - 1}{Tb - Ta} \times DX;\ Y + \frac{Tj + Tj - 1}{Tb - Ta} \times DY\right]$$

However, since there is generally no pixel of frame Tj corresponding to the point of intersection C, because the displacements in the frame are generally not integer values, and since the goal is to attribute a prediction value to each pixel $P(X_p Y_p)$ of the frame Tj, the pixel having the coordinates closest to those of the point of intersection C is attributed the displacement vector of the point C, as can be seen in the examples shown in FIGS. 13c and 13d. Under these conditions, the displacement vector $D^PO$ (P,Tj) which is attributed to.the point P is equal to the displacement vector D(B,Tj-1) of the point B in the frame Tj-1.

For the processing of the conflicts when, for example, a number of quadruplets (X, Y, DX, DY) of the frame Tj-1 end up at the same point with coordinates $(X_p, Y_p)$ in the frame Tj, the solution that is adapted consists in computing the temporal difference in the direction of motion between the frames Tc and Tb per displacement vector received, adopting as the temporal prediction only the displacement which gives the smallest difference DFD. Other solutions might be contemplated. A second solution, for example, might consist in keeping only the first motion presented: i.e. when a point of the frame Tj has received one motion, it can no longer receive any others. However, this solution appears to be rather inappropriate since it is not possible to judge whether the first value attributed to the point is appropriate as an initial value.

Furthermore, this solution makes it necessary to carry out a test at each point to ascertain whether a motion has been attributed to this point or not.

Again, according to a third solution it is also possible, more simply, to consider keeping only the last motion presented. However, there is still a problem similar to that mentioned with reference to the second solution. In the case of a motion where the object and the background move, as in the second solution, in opposite directions, this third solution will give good results, but motions of the object relative to the background are reversed; the object still passes behind the background.

The gaps are dealt with as follows: as indicated. above, it may happen that certain pixels of the frame Tj are not attributed any motion (FIG. 13f). These gaps in the motion field of prediction are filled by spatial interpolation of the motion vectors of the closest vicinity. To do this, when the method has associated the corresponding motions with the pixels closest to the points of impact, it will search for the gaps in the prediction field of the frame Tj obtained in this way, alternating the direction of horizontal scanning every second line.

When in the presence of a gap, four points of the vicinity are then considered as shown in FIGS. 15a and 15b. In the configurations shown in FIGS. 15a and 15b, it is assumed that the points in the causal vicinity (A on the one hand, B or C according to the direction of horizontal scanning on the other) have already been processed, and that they have a motion vector. However, depending on the direction of scanning, the points C or B and the point D may have no motion vector, and may also constitute gaps. In this event, they are not taken into account for the interpolation. In these cases, the method attributes to the gap the motion derived from the average of the motion vectors of the points of the spatial vicinity. This computation is done at best with four motion vectors (points A, B, C and D) and, at worst, with two motion vectors (points A, and B or C depending on the scanning, with C or B and D also being gaps).

The process of temporal prediction for displacement estimators between frames Tc and Tb for points belonging to a frame Tc or Tb is similar.

Considering, for example, as shown in FIG. 16, the motion field between the frames Ta and Tb computed for the points of the field Tb, and taking the hypothesis of a linear motion, the motion of the pixel B with spatial coordinates (X,Y) can be attributed to a point C of the frame Tc, with spatial coordinates (XI, Y1) which is the point of impact on this frame of the motion vector attributed to the point B. In this case, the coordinates (X1, Y1) verify the relationship:

(X1,Y1)=(X+DX, Y+DY+DEY)

where DX and DY designate the components of the displacement vector D of the point B in the frame Tb and DEY designates the vertical offset if any between the frames Tb and Tc (if the frames are of different parities).

As the point C generally does not correspond to a pixel, it is to the pixel closest to the point C that the motion vector of the point C is attributed: if we designate as P(XP,YP) the pixel closest to the point C, we thus obtain the relationship:

$$D^P{}_0(P,Tc) = D(B,Tb)$$

The conflicts and gaps in the prediction field are processed in the same way as described above.

Figure 17:
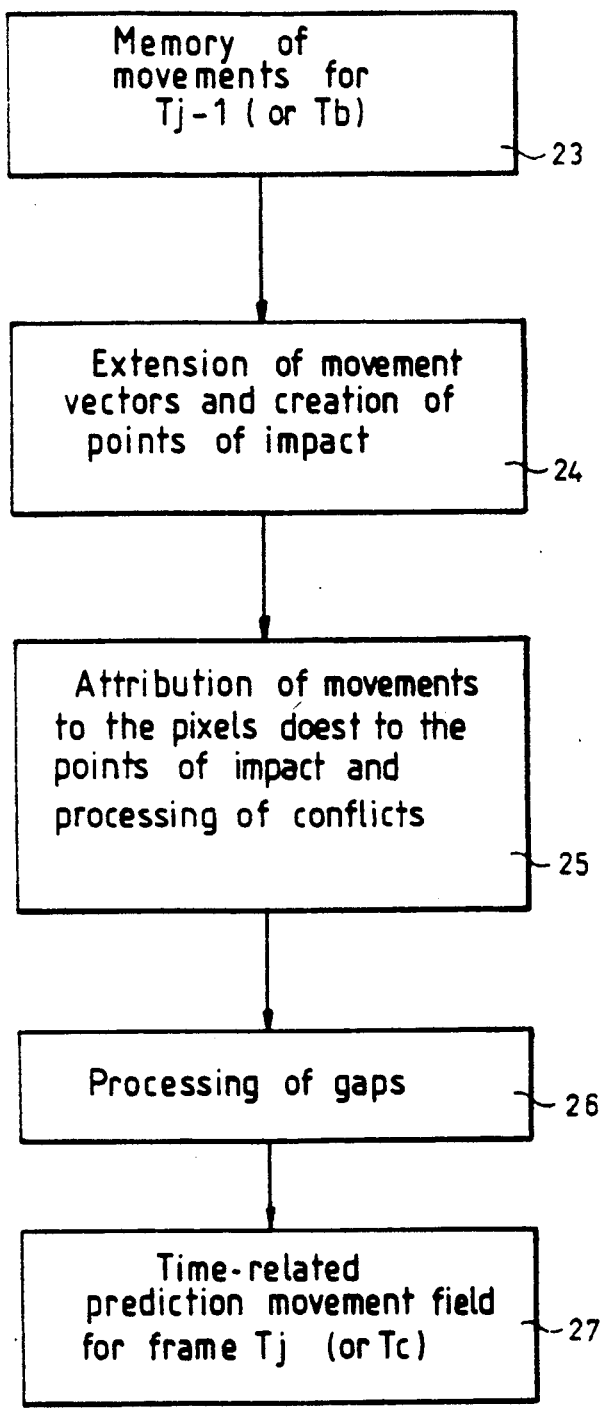
FIG. 17 is an operational chart to illustrate the various steps of the method for preparing a temporal prediction according to the invention.

The various steps of the temporal prediction process are summarized in the operational chart in FIG. 17. A first step 23 consists in memorizing the displacement vectors of each frame Tj-1 or Tb to extend the displacement vectors to step 24, in order to determine their points of impact on the frames Tj or Tc. At step 25, the displacement vectors are attributed to the pixels closest to the points of impact and the conflicts between vectors arriving at the same points of impact are resolved. The gaps are processed at step 26 and the memorization of the motion fields for the fields Tj or Tc takes place at step 27.

To obtain very good prediction, it is necessary to add the predictions obtained previously in the spatial-causal vicinity of the current point to the temporal prediction of the motion fields obtained at the step 27.

This leads, according to the previously described examples, to setting the number of initial displacements at five. Four are selected in the closest causal vicinity (spatial recursion) and one is selected by the method of temporal prediction described previously.

Figure 18:
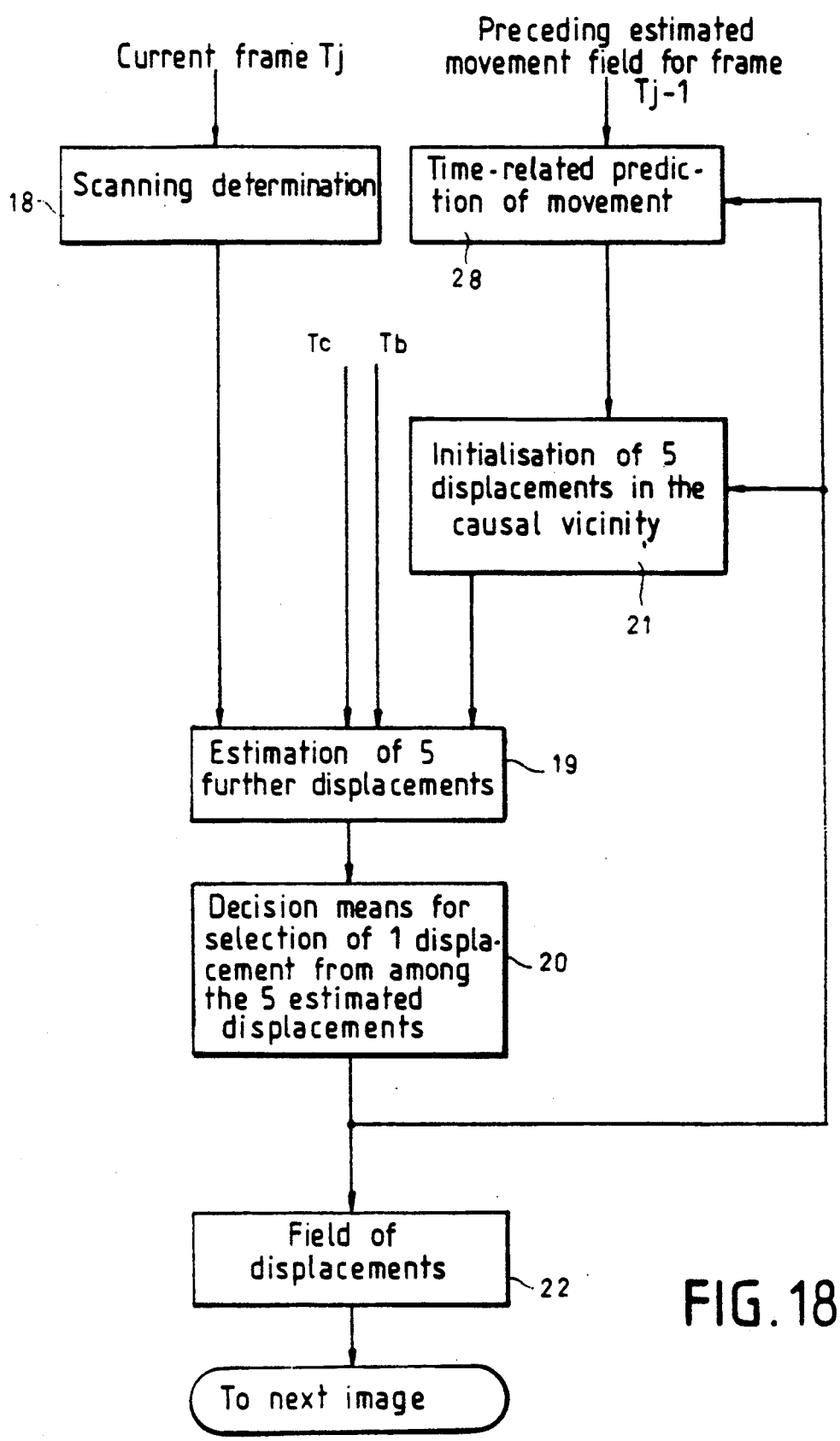
FIG. 18 shows the changes to be made to the operational chart of FIG. 10 to allow estimation of motion with temporal prediction.
Figure 20:
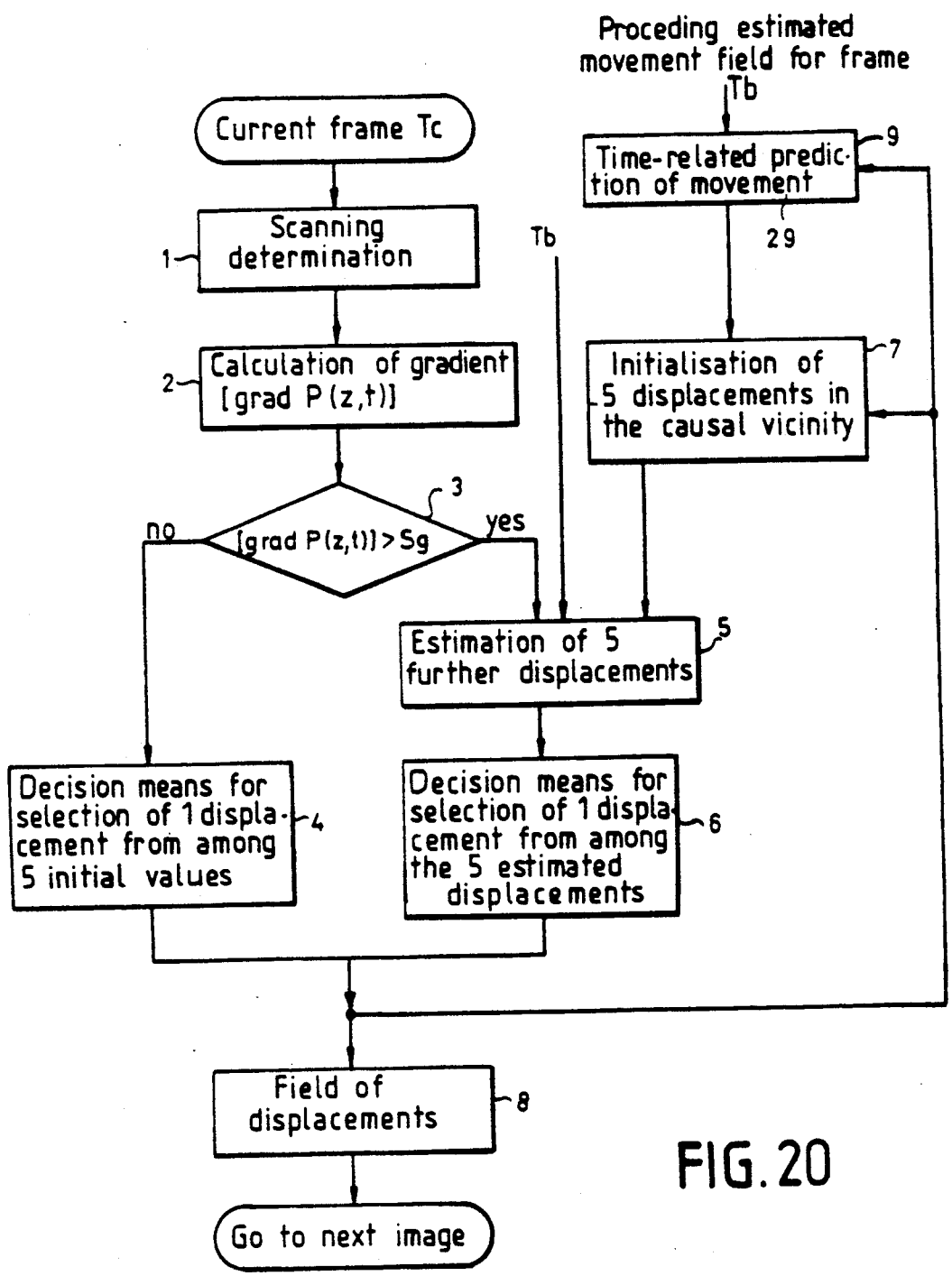
FIG. 20 shows the changes to be made to the operational chart of FIG. 2 to enable an estimation of motion with temporal prediction corresponding to the first type of displacement estimation.

Under these conditions, the methods described by the operational charts in FIGS. 2 and 10 have to be modified according to FIGS. 20 and 18 respectively to introduce the temporal prediction parameter in each initialization stage.

According to a first step shown as 18 in FIG. 18, each point of the current frame is considered by scanning each line of this frame. The method consists in executing the processing operations indicated at step 19 to estimate five further displacements on the basis of four initial displacement values determined in the causal vicinity of the current point, and on the basis of an initial temporal prediction value defined at step 28. At the end of the execution of step 19, the method proceeds to the execution of step 20 and a selection is made of one displacement from among the five displacements that have been estimated at step 19. Thus, the method follows its course by successive iterations, with each end of execution of step 20 prompting the initialization of the following point and the displacements are recorded at step 22.

The five displacement estimations are done in parallel on the basis of the four initial spatial values $D^A{}_0$, $D^B{}_0$, $D^C{}_0$ and $D^D{}_0$, and of the initial value $D^P{}_0$. A point is considered as convergent when at least one of the five displacement values $D^A{}_i$, $D^B{}_i$, $D^C{}_i$, $D^D{}_i$ and $D^P$ gives an absolute value for the displaced frame difference DFD(z, $D_i$) below the threshold S defined previously for an iteration number i greater than or equal to zero (with i=0 designating an initial value) and lower than or equal to the maximum iteration number $i_{MAX}$ ($0 \leq 1 \leq i_{MAX}$). If no displacement value gives a value |DFD| less than or equal to S, the point is considered as divergent, but a displacement is nonetheless attributed to it, that displacement which, out of $D^A{}_{iMAX}$, $D^B{}_{iMAX}$, $D^C{}_{iMAX}$, $D^D{}_{iMAX}$ and $D^P{}_{iMAX}$ gives the lowest absolute value of DFD.

On each iteration (from 0 to $i_{MAX}$) we therefore obtain five values of |DFD($D_I$)| which are compared with the threshold S.

The displacement adopted is the first that gives a |DFD| less than or equal to the threshold S. If several displacements are obtained in the same iteration, the displacement that gives the lowest displaced frame difference is selected. In the event of equal values for |DSD| occurring again, an arbitrary selection is made in the sequence $D^P{}_i$, $D^A{}_i$, $D^B{}_i$, $D^C{}_i$, $D^D{}_i$. Thus, associated with each iteration i ($0 \leq i \leq i_{MAX}$) there is a displacement $D_1$, a displaced frame difference DFD and an iteration number i.

The decision, then, is taken on the lowest number of iterations, then on the minimum displaced frame difference DFD and, then, if applicable, an arbitrary selection is made.

In similar fashion to the method described using the operational chart in FIG. 2, each point of a current frame is considered on the operational chart in FIG. 20 by scanning each line of this frame.

The modulus of the gradient at the current point |grad P(z,t)| is computed at step 2.

A test on this modulus of the gradient at the current point is carried out at step 3.

If |grad P(z,t)| is low, the selection of a displacement for the current point is done using decision unit 4. Five initial values are considered: four in the spatial-causal vicinity and one initial value of temporal prediction. No computation of the correction term is done. Then to step 8.

Figure 21:
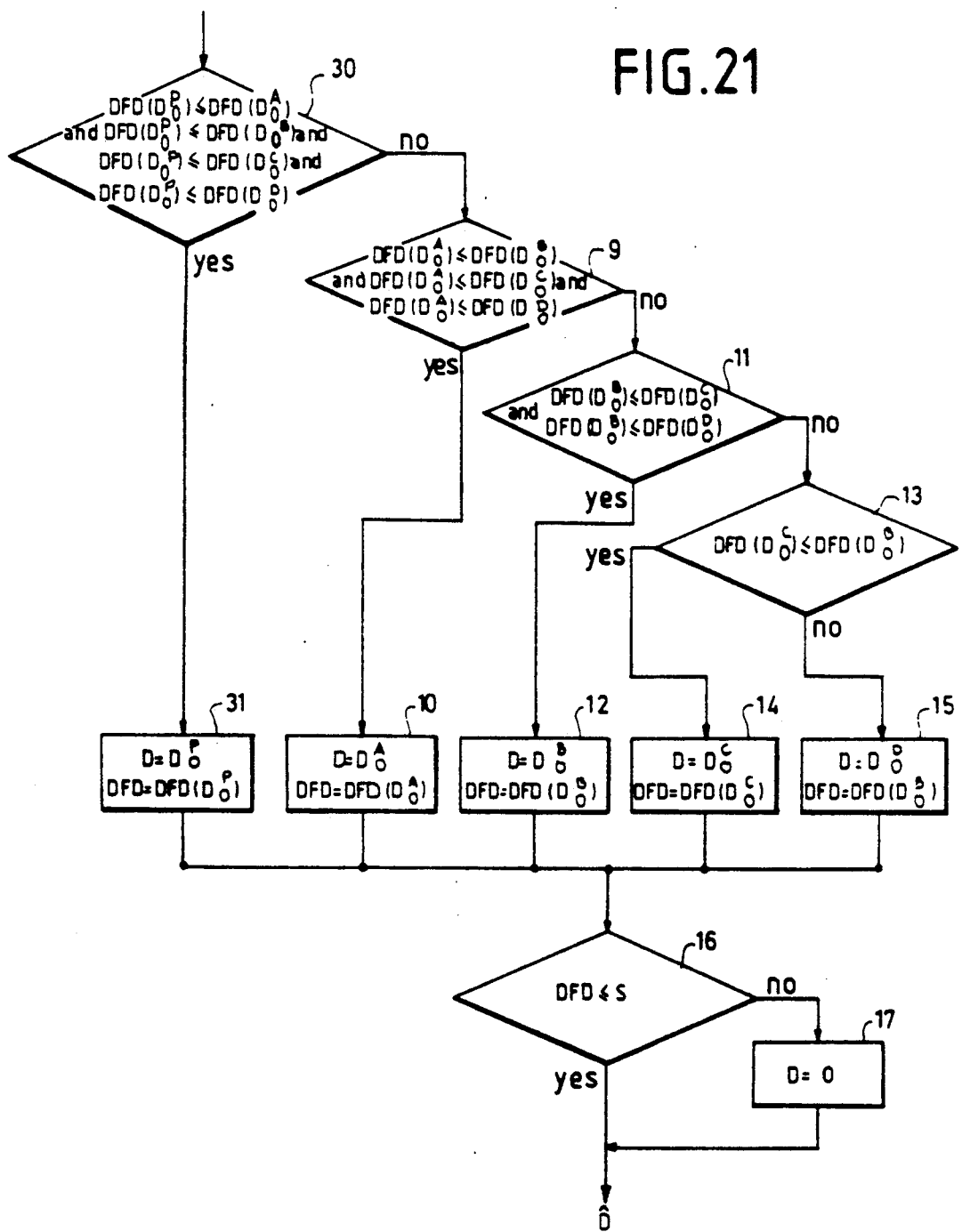
FIG. 21 shows the changes to be made to the operational chart of FIG. 8 to enable an estimation of motion with temporal prediction.

If |grad P(z,t)| is high, five new displacements are estimated in parallel at step 5 on the basis of the five initial values (four spatial and one temporal). Step 6 consists in selecting one displacement from among the five displacements that have been estimated at step 5. Each end of execution of step 4 or 6 prompts the initialization of the following point (steps 7 and 9) and the displacements are recorded at step 8.

Where the gradient of the image is low, a displacement is selected, as shown in FIG. 21, from among five initial values, with the selection of the four spatial displacement values being done according to steps 9 to 17 identical to those shown in FIG. 8, and the selection of the temporal displacement value being made by the execution of the steps 30 and 31. As previously, the displacement adopted is that which, out of the displacements $D^P{}_0$, $D^A{}_0$, $D^B{}_0$, $D^C{}_0$ and $D^D{}_0$, gives the lowest displaced frame difference. In the event of equal values being obtained, the selection is made in the order $D^P{}_0$, $D^A{}_0$, $D^B{}_0$, $D^C{}_0$ and $D_{D0}$. However, if the displaced frame difference is not less than or equal to the threshold S of convergence, the displacement selected is returned to zero.

When the gradient of the current image is high, the five displacement estimations are carried out in parallel on the basis of the four spatial initial values $D^A{}_0$, $D^B{}_0$, $D^C{}_0$ and $D^D{}_0$, and of the temporal initial value $D_0$. A point is considered to be convergent when at least one of the five displacement values $$D^A{}_i, D^B{}_i, D^C{}_i, D^D{}_i, D^P{}_i$$

gives an absolute value for the displaced frame difference DFD(z,$D_i$) below the threshold S defined previously for an iteration number i greater than or equal to zero (with i=0 designating an initial value) and less than or equal to the maximum iteration number $i_{MAX}$ ($0 \leq i \leq i_{MAX}$). If no displacement value gives a value $|DFD|$ less than or equal to S, the point is considered as divergent, but a displacement is nonetheless attributed to it—that displacement which, from among $D^A{}_{iMAX}$, $D^B{}_{iMAX}$, $D^C{}_{iMAX}$, $D^D{}_{iMAX}$ and $D^P{}_{iMAX}$ gives the lowest absolute value of DFD.

At each iteration (from 0 to $i_{MAX}$), we obtain five values of $|DFD(z,D_i)|$ which are compared to the threshold S.

The displacement adopted is the first that gives a $|DFD|$ less than or equal to the threshold S. If several displacements are obtained on the same iteration, the displacement giving the lowest displaced frame difference $|DFD|$ is selected. In the event of equal values for $|DFD|$ occurring again, an arbitrary selection is made in the order $D^P{}_i$, $D^A{}_i$, $D^B{}_i$, $D^C{}_i$, $D^D{}_i$.

Thus, with each iteration, i ($0 \leq i \leq i_{MAX}$), there is associated a displacement $D_i$, a displaced frame difference DFD and an iteration number i.

The decision is made on the lowest iteration number, then on the minimum displaced frame difference DFD, with an arbitrary selection then being made if applicable.

According to other embodiments again of the process according to the invention, it is also possible to make modifications in the number of initialization vectors or in the direction of the propagation of the motion in the image.

In the above-described motion estimation methods, to avoid favoring one direction of horizontal propagation of the motion in the image, from left to right for example, the direction of scanning is reversed every second line alternately. It is self-evident that, to avoid favoring one direction of vertical propagation of the motion in the image, from top to bottom for example, it is also possible to reverse the vertical scanning direction every second image alternately. Without temporal tracking, the alternation of the vertical scanning seems pointless because of the independence of the computation of the motion fields between successive images.

But the combination of temporal tracking with the alternation of the direction of recursion makes it possible to obtain a motion field that is more precise and less sensitive to this direction of recursion, and to accelerate the convergence of the estimator, in particular at the top of the image with respect to an estimation with purely spatial recursion of vertical direction from top to bottom.

It is also to take, in addition to the initial motion of temporal prediction, only three spatial initial values of displacement of the causal vicinity: $D^B{}_0$, $D^C{}_0$ $D^D{}_0$ or only two initial values $D^C{}_0$ and $D^D{}_0$ (FIGS. 4b and 4c). This is justified from the point of view of the construction: the use of the motion estimated for the point A as a prediction of motion for the current point z prevents any parallel estimation for the current line. However, the elimination of $D^A{}_0$ also means the disappearance of horizontal recursion and the advantage of the alternation of line scanning, which increases the recursion direction effect in the estimation of the motion (essentially vertical).

According to yet another embodiment of the method according to the invention, the alternation of the direction of propagation of the motion from one frame to the next one may be obtained by rotation. Indeed, the relationships (1) and (24) described previously define a relationship between the horizontal and vertical components of the motions Dx and Dy, the spatial gradients of the horizontal luminance GX and vertical luminance GY, and the temporal gradient in the direction of an initial motion DFD.

such that GX x DX + GY x DY = −DFD and the correction function for the equation (1) D determines a particular solution for this equation:

$$D = \frac{-DFD \times G}{|G|^2}$$

with $G \neq (GX, GY)^T$

Under these conditions, in the presence of a purely vertical contour (GX=0, GY=0), the DX component is determined unambiguously. The same holds for the DY component in the presence of a horizontal contour However, in an image, the spatial gradients are not distributed uniformly. Whence the importance of recursion in the propagation of the significant components of the motion: this propagation must be as isotropic as possible to create a precise and homogeneous motion field.

This is why it is possible to consider making each pair of images on which motion is estimated undergo a rotation of one quarter turn: this enables the direction of the recursion to be changed at each image. The combination of this rotation with the temporal tracking favors faster convergence of the estimator on the real motion.

This modification is particularly significant where, for example, there is no prediction vector $D^A{}_0$ had on the same line as the current point or, more generally, where the number of prediction vectors is reduced to one or where the choice of these prediction vectors reduces the angular arc of propagation of the motion by recursion by reducing the spatial interdependence of the estimated vectors.

This modification may be achieved as follows:

1. The initialization vectors are still the vectors $D^C{}_0$, $D^D{}_0$ and, if applicable, $D^B{}_0$ as defined previously.

2. At each new motion field to be estimated, the new pair of source images is rotated. This rotation is alternately by 0°, 90°, 180° and 270°, to return to the same value every four motion fields.

3. In the same way, the motion field with temporal prediction undergoes the same rotation and the sign of one or both the components of the motion is modified according to the rotation, so as to retain the positive directions of displacement.

4. Thus, the only modifications occurring in the estimator concern the image format: the parameters of the beginning and end of column DC and FC and of the beginning and end of line DL and FL are exchanged at each new pair of images: DC takes the value of DL and vice versa, FC takes the value of FL and vice versa.

5. At the end of estimation of the motion field, the field is rotated and undergoes a change of reference point which returns it to the initial orientation, for application without estimation of motion and temporal prediction.

Figure 22:
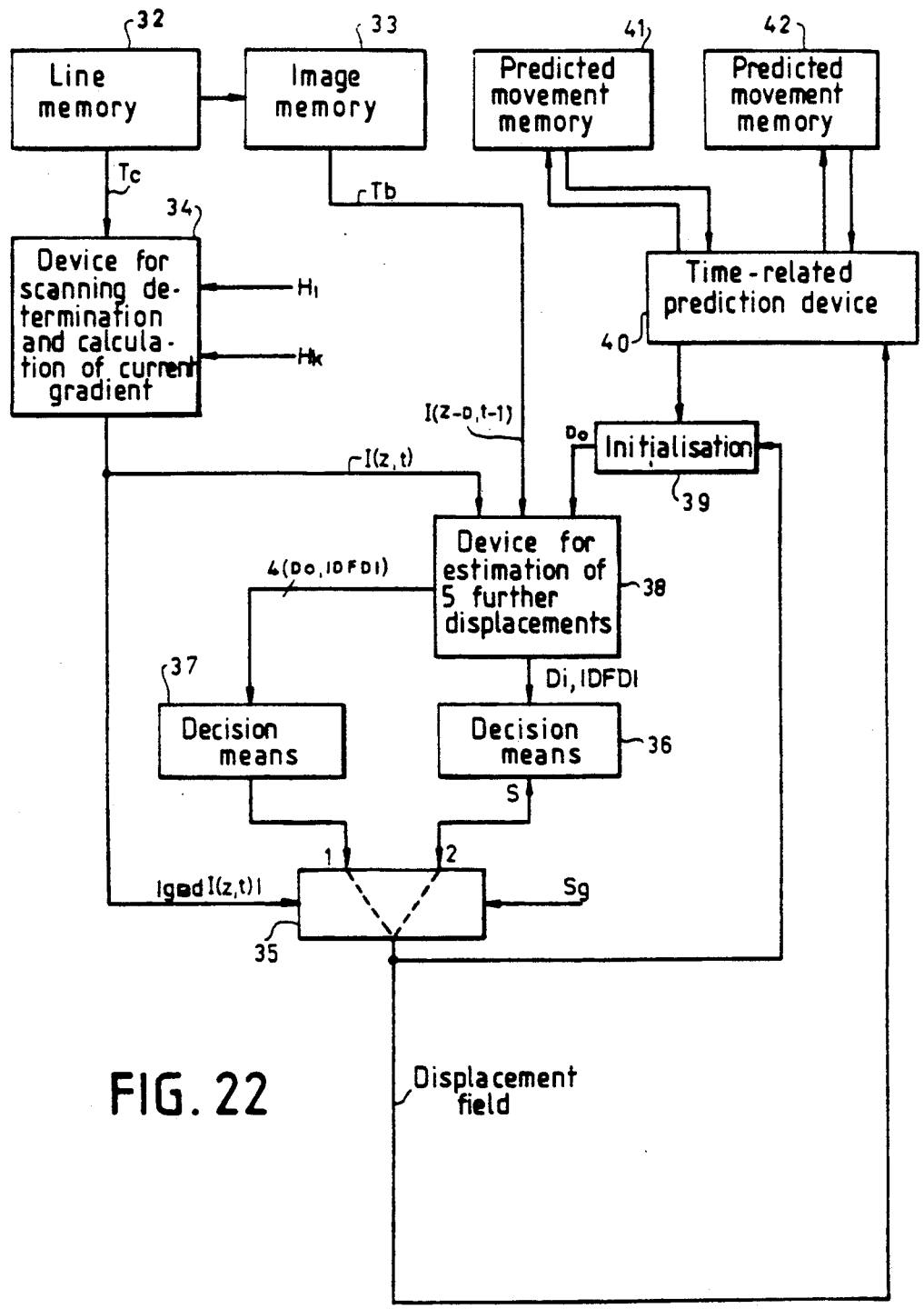
FIGS. 22 to 27 show embodiments of devices for the implementation of the method according to the invention.
Figure 23:
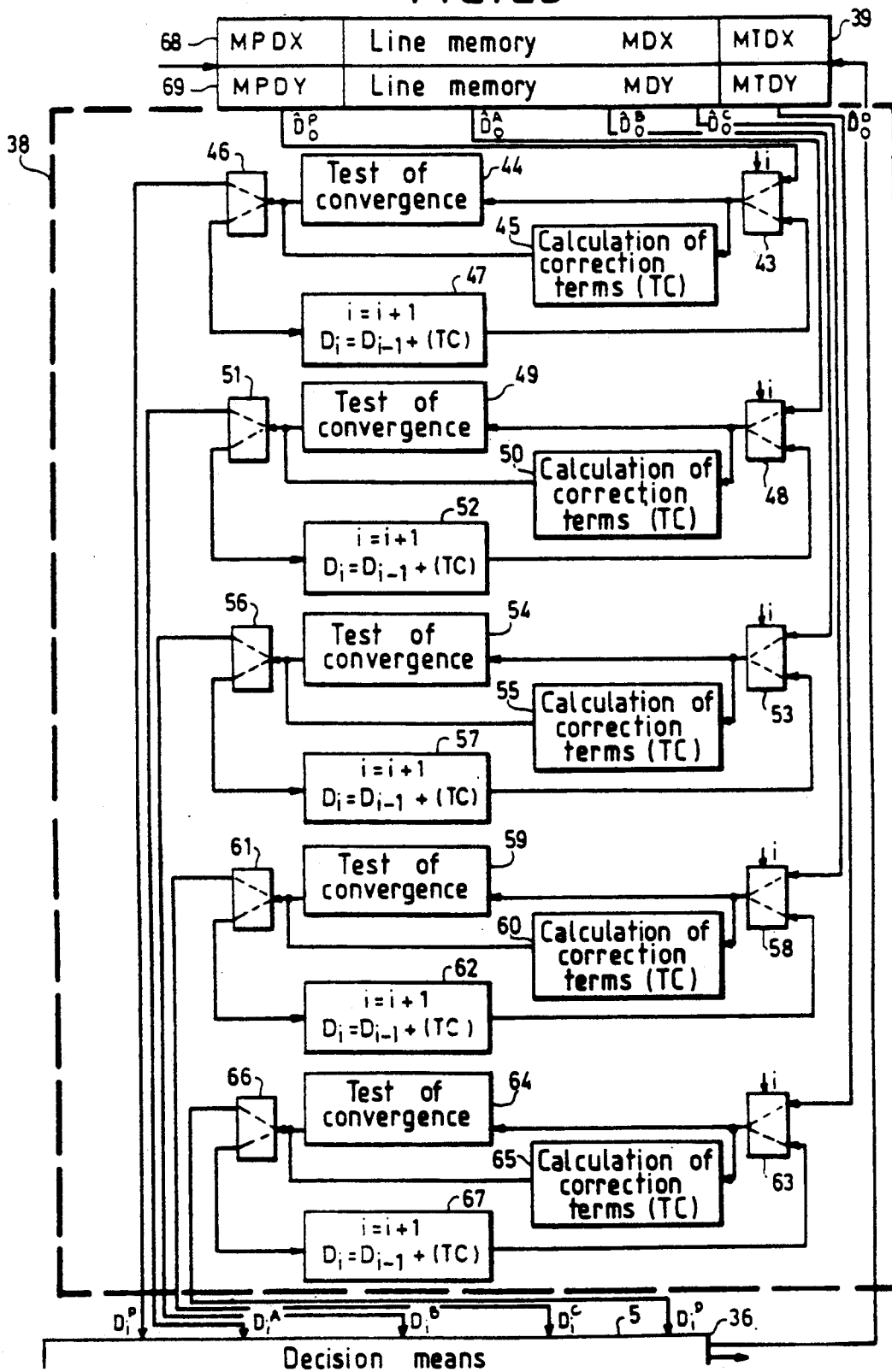
Figure 24:
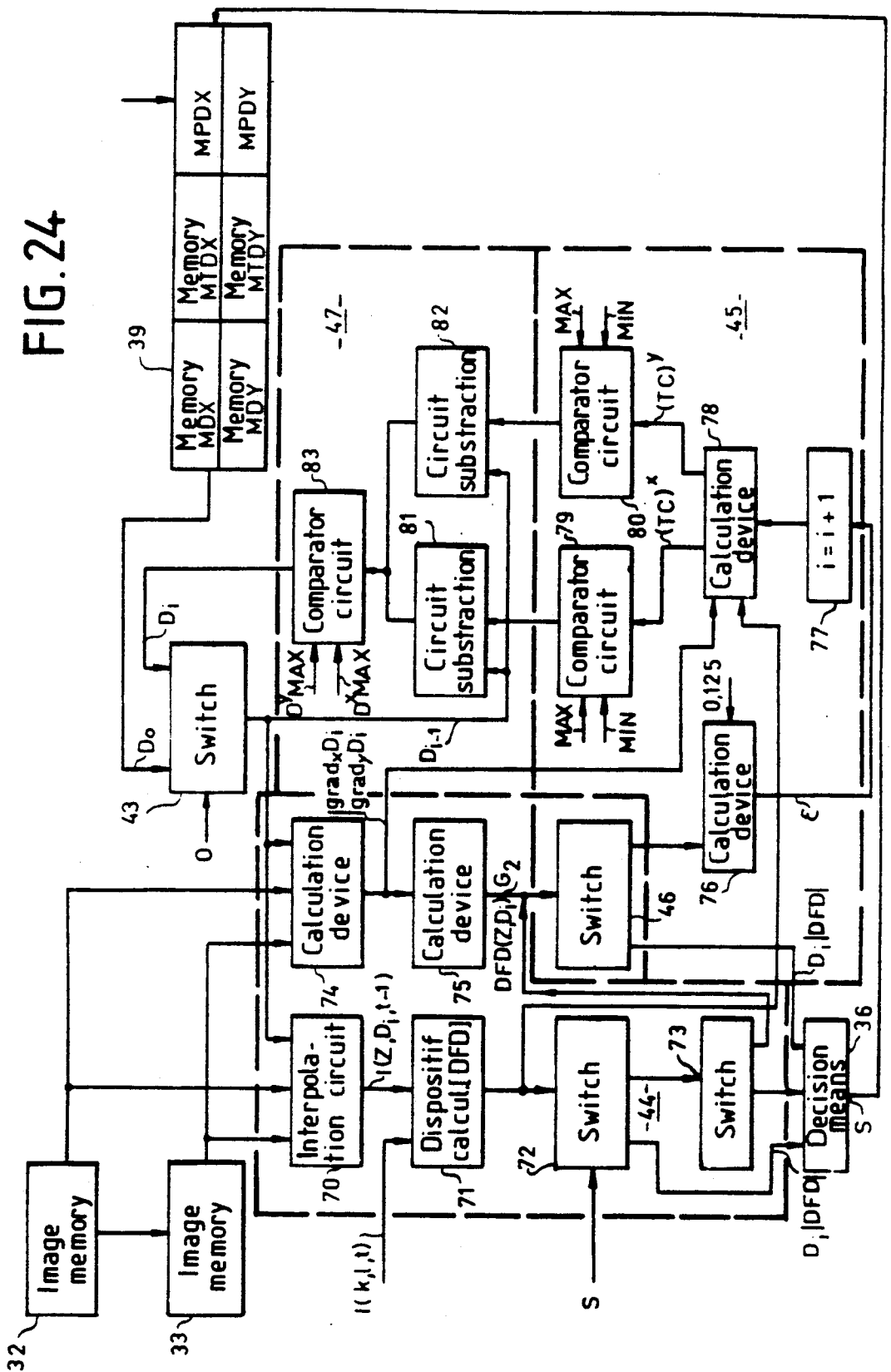

An exemplary embodiment of a first device for displacement estimation implementing the steps of the method represented in FIGS. 20 and 21 is now described using FIGS. 22 to 24. It is made up, in FIG. 22, of a set of line memories 32, an image memory 33, a device 34 for determining the scanning direction and for computing the modulus of the current gradient, a switching device 35, decision units 36 and 37 and a displacement estimation unit 38, an initialization device 39 and a temporal prediction device 40 connected to predicted motion memories 41 and 42. The device 34 for determining the scanning direction and computing the modulus of the current gradient receives its data from the set of line memories 32 and provides the result of the computations to the displacement estimation device 38 and to the switching device 35. The displacement estimation device 38 has two inputs which are connected, on the one hand, to the output of the set of line memories 32 through the device 34 for determining the scanning direction and computing the current gradient and, on the other hand, to the output of the image memory 33. The line memory 32 acts as a buffer for the image memory 33, to store the refresh data for the image memory 33 until the points analyzed are outside the exploration window. With an exploration window occupying a space of 10 lines of the type described in FIG. 7, a line memory with a point storage capacity corresponding to five successive lines appears to be sufficient. The computations performed take place at the point frequency, to the rhythm of clock pulses $H_1$ and $H_k$ provided by a line clock, not shown. The device 34 determines the current line 1 number and, as a function of the parity of the current line 1 number, it determines the column number of the current point k. With the coordinates (k,l) now available to it, the device 34 computes the modulus of the current gradient. The switching device 35 compares the result of the computation provided by the device 34 with a reference threshold Sg and, in accordance with the algorithm shown in FIG. 20, validates its input 1 or 2. The input 1 is selected if $|\text{grad } 1(z,t)| \leq Sg$ and the input 2 is selected if $|\text{grad}|1(z,t)| > Sg$. The decision units 36 and 37 have the functions described by the operational chart of FIG. 22, and can be made in known fashion, either using a micro-programmed structure of the microprocessor type or with a wired logic system made up, in a known fashion, of comparator circuits.

One embodiment of a displacement estimation device is shown in FIG. 23. It is formed by a computation set made up of the elements 43 to 47. This set provides displacement data items $D^A_i$, $D^B_i$, $D^C_i$, $D^D_i$ and $D^P_i$ to the decision unit 36 which convey them to the input 2 of the switching device 35, FIG. 22. The initialization unit 39, also shown in FIG. 23, allows the initialization of the displacement computation algorithm. The unit 39 comprises a first register 68 and a second register 69. The registers are made up of three distinct parts, one to memorize the binary words representing the word for displacement in X or Y, called MDX and MDY respectively, another to act as a buffer memory for the displacement words MTDX and MTDY computed by the decision unit 36 and the last part for memorizing the words of the temporal displacement algorithm MPDX and MPDY.

Using the above designations, we have:
MDX=(FC-DC-2D$X_{MAX}$+3) displacements
MDY=(FC-DC-2D$X_{MAX}$+3) displacements
MTDX=1 displacement
and
MTDY=1 displacement.

At the end of each frame of images, the set of words MDX, MDY, MTDX and MTDY is returned to zero. MTDX and MTDY are used as intermediaries before overwriting the words MDX and MDY corresponding to the displacements D(k-1, 1-1) for proceeding to the analysis of the following point (k+1,1). They are also used as intermediaries before overwriting the words MDX and MDY corresponding to the displacements D(k+1,1-1) for proceeding to the analysis of the following point (k-1,1).

When k is equal to FC, the estimated displacement D(FC,1) is automatically placed in the words (MDTX, MDTY) and in the words of (MDX, MDY) corresponding to the displacements D(FC,l) and D(FC+1,1).

When k is equal to DC, the estimated displacement D(DC,1) is automatically put in the words (MTDX, MTDY) and in the words of (MDX,MDY) corresponding to the displacements D(DC,1) and D(DC-1,1).

The device for the computation of displacement estimations, made up of elements 43 to 67, carries out five displacement computations in parallel on the basis of four initial values, $D^P_0$, $D^A_0$, $D^B_0$, $D^C_0$, $D^D_0$ contained in the initialization unit 39 when the spatial gradient of the current image is above the threshold Sg defined previously. The data items $D^P_0$, $D^A_0$, $D^B_0$, $D^C_0$, $D^D_0$ are applied respectively to the first inputs of each of the switching circuits 43, 48, 53, 68 and 63, the outputs of which are connected to convergence test and correction term computation units designated respectively (44,45), (49,50), (54,55), (59,60) and (64,65). The results of the convergence tests and the correction term computation are applied to the inputs of the switching devices designated 46, 51, 56, 61 and 66 respectively, which then send them either to the respective inputs of the decision unit 36, or to devices for the computation of further displacements 47, 52, 57, 62 and 64, when the resolution of the above-described algorithm diverges for i less than $i_{MAX}$. The further displacements provided by the computation devices 47, 52, 57, 62 and 67 are applied respectively to the second inputs of the switching devices 43, 58, 53, 68 and 63.

The details of the embodiment of a convergence test unit 44 associated with a correction term computation unit 45 and a unit for the computation of further displacements 47 are shown in FIG. 24 within lines of dashes.

The convergence test unit 44 comprises, on the one hand, an interpolation circuit 70 coupled with a device 71 for computing the absolute value of the displaced frame difference |DFD|, with this device being coupled with the decision unit 36 through change-over switches 72, 73 and, on the other, a gradient computation device 74 coupled to a device 75 for computing the sum of the squares of the displaced gradients. The interpolation circuit 70 consisting, where applicable, of a programmable read-only memory, is also coupled with the image memory 33. The correction term computation unit 45 comprises a device 76 for computing the value described previously, coupled with an increment computation device 77 and with a device 78 for computing correction values, as well as comparator circuits 79 and 80.

The unit 47 for the computation of further displacements comprises subtractor circuits 81 and 82, both coupled with a comparator circuit 83. The coupling between the convergence test unit 44 and the correction term computation unit 45 is made by the change-over switch 46 of FIG. 23. The input of the change-over switch 46 is directly coupled to the output of the computation device 75 and to the output of the computation device 71 through the change-over switches 72 and 73. Also, as in FIG. 23, the initialization unit 39 is coupled with the convergence test unit 44 via the change-over switch 43. This change-over switch connects the initialization unit 39, on the one hand, to a first input of the interpolation circuit 70 and, on the other hand, to a first input of the computation device 74. The second input of the change-over switch 43 is also coupled to the output of the computation unit for computing the further displacement 47 which is formed by the comparator circuit 83.

The operation of the displacement estimation device is as follows. For each of the current points of the image, the change-over switch 43 conveys an initial value $D_0$, found in the register 39, to the interpolation circuit 70 and to the gradient computing device 74. A bilinear interpolation computation on the value $D_0$ is performed by the interpolation circuit 70 to determine the luminance of the displaced current point in the preceding image $(1(z-D_0, t-1)$. The displaced frame difference $DFD(z,D_0)$ and its absolute value are computed by the computation device 71 on the basis of the luminance of the current point. The change-over switch 72 conveys the value computed by the computation device 71 to the decision unit 36 when the value obtained is less than or equal to the previously defined threshold S. The displacement $D_0$ and the absolute value of the displaced frame difference $|DFD(D_0)|$ are applied to the inputs of the decision unit 36. Otherwise, the result supplied by the computation device 71 is applied to the input of the change-over switch 73, then to that of the decision unit 36 when the value of the iteration i is equal to the maximum iteration value $i_{MAX}$. By contrast, when the value of the iteration i is less than the maximum value, the result is applied to the inputs of the correction computation unit 45 through the change-over switch 46.

In the course of these computations, which are carried out during a time t from the instant t=0, the displaced gradients $grad_x$ and $grad_y$ and the term $G_2 = 2.(grad^2_x + grad^2_y)$ are computed by the computation device 75.

Depending on the value of G2, the switch 46 directs the result obtained either to the decision unit 36 if the value of $G_2$ obtained is less than or equal to a coefficient value of, for example, 0.125 or to the unit for the computation of the correction term of further displacements 45 and 47.

The computation device 76 computes the value $\epsilon = 1/G_2$. The iteration value i is incremented by one unit by the computation device 77, and is returned to zero upon analysis of the following current point. The computation of the correction terms $(TC)^x$ and $(TC)^y$ for X and Y is carried out by the circuit 78. The values $(TC)^x$ and $(TC)^y$ obtained at the outputs of the computation device 78 verify the relationships:

$$(TC)^x = DFD(z,D_i) \times grad_x(D_1) \times$$

and $$(TC)^y = DFD(z,D_i) \times grad_y(D_1) \times$$

The values $(TC)^x$ and $(TC)^y$ obtained are applied to the inputs of the comparator circuits 79 and 80 respectively to be limited, except as regards sign, to the maximum and minimum values. According to a preferred embodiment of the invention, the minimum values of $(TC)^x$ and $(TC)^y$ are the same and are set at 1/16, whereas the maximum value of $(TC)^x$ is set equal to 3 and the maximum value of $(TC)^y$ is set equal to 2. The terms $(TC)^x$ and $(TC)^y$ obtained are added to the displacement values of $D^x0$ and $D^y0$ by the subtractor circuits 81 and 82, and the results obtained $D^x1$ and $D^y1$ which correspond to the estimated displacements are again limited by the comparator circuit 83 before being applied to the second input of the change-over switch 43. On the following iteration i (i=2), the change-over switch 43 applies the estimated displacements $D^x$ and $D^y_1$ to the circuits 70, 74, 81 or 82.

At the output of the decision unit 36, a displacement is selected for the current point and is written in the buffer memory 39 containing the words MTDX and MTDY. i is returned to zero and the change-over switch 43 returns to its initial position and the previously described computations are recommenced for estimation of the displacement of the new current point.

Figure 25:
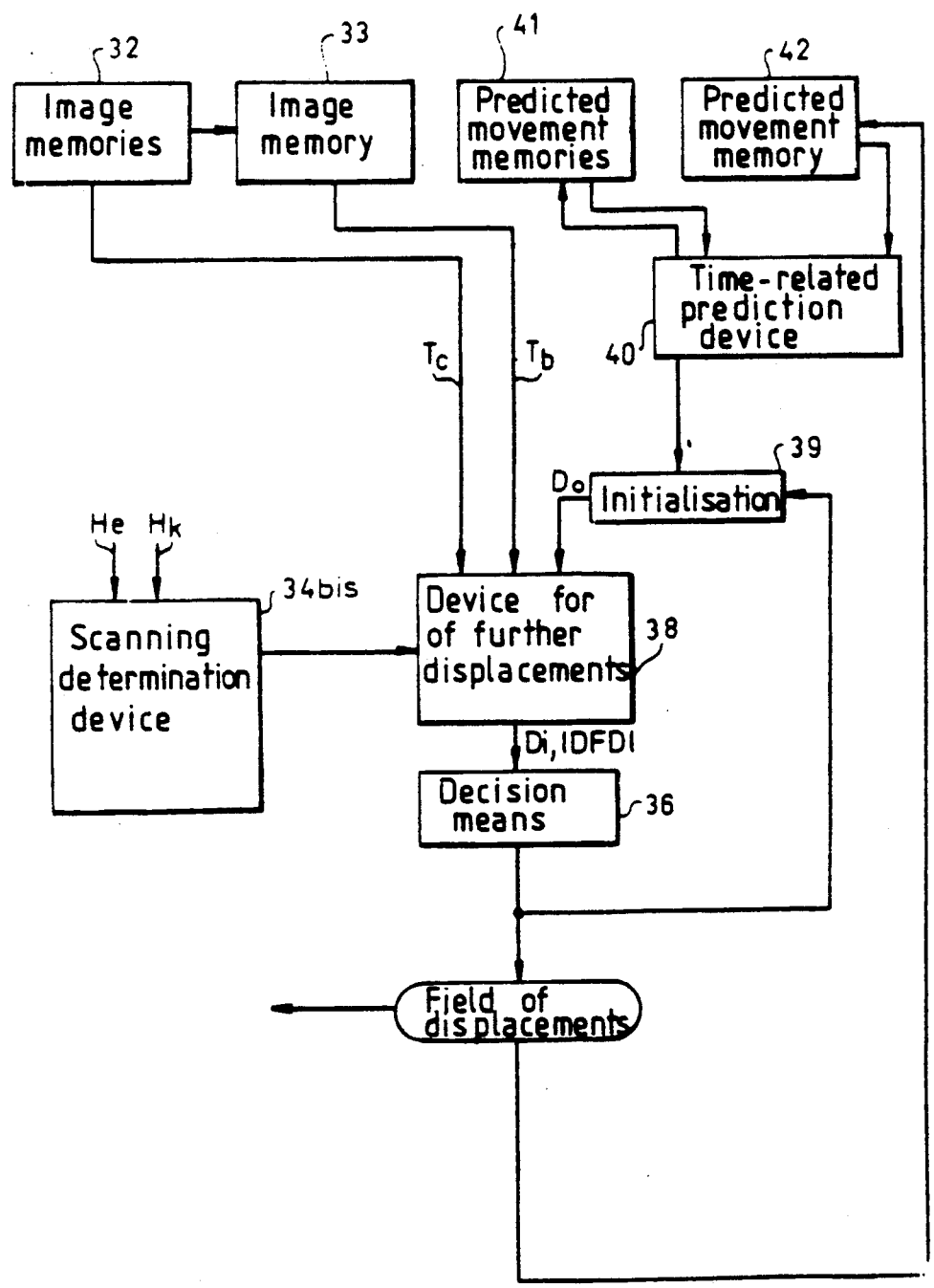
Figure 26:
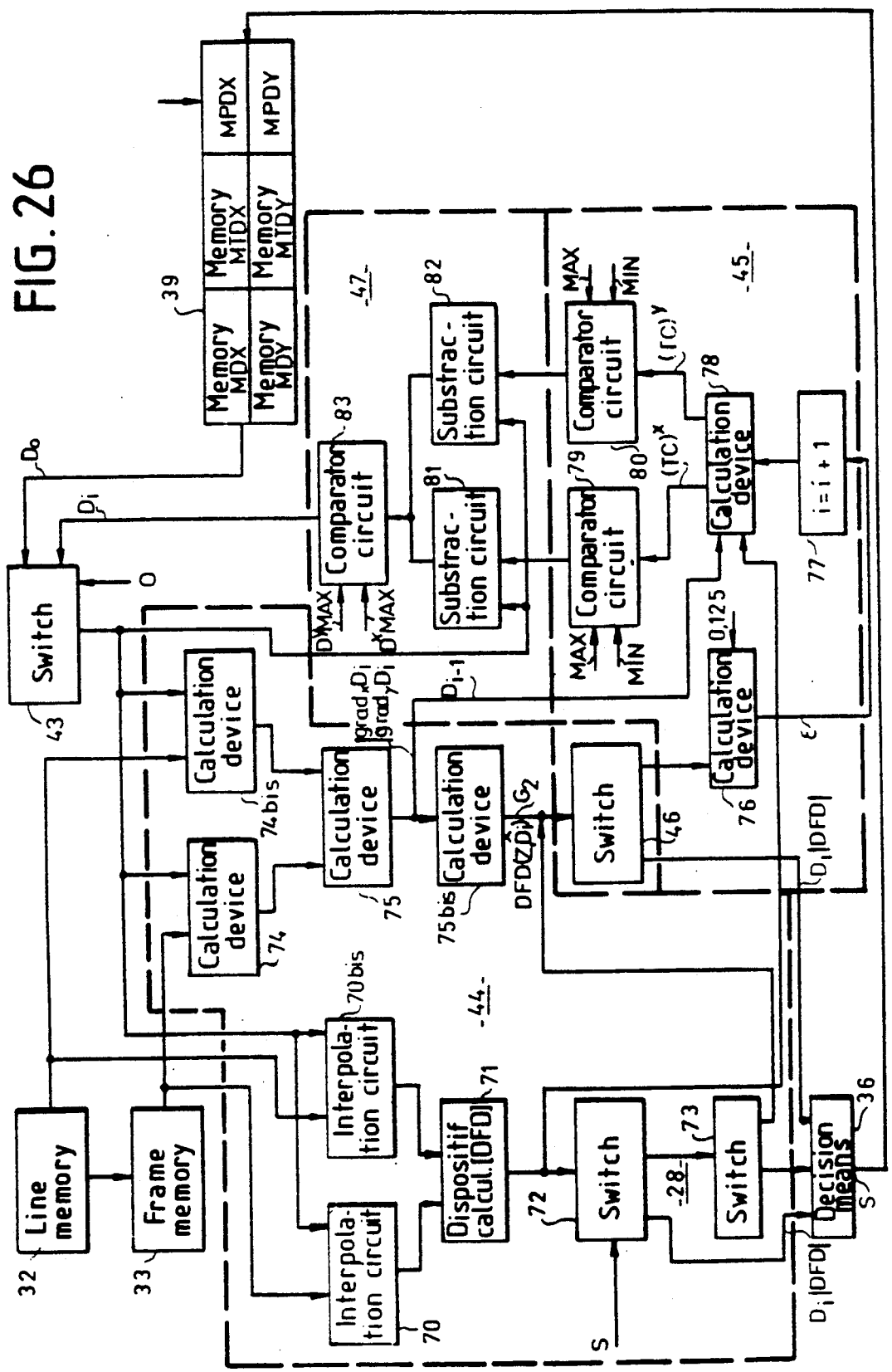

An exemplary embodiment of a second displacement estimation device implementing the steps of the method shown in FIG. 18 is shown in FIGS. 25 and 26. The device shown in FIG. 25 differs from the example described in FIG. 22 essentially by virtue of the fact that it has only one decision unit 36 and that it does not have a switching device 35. Hence, the elements similar to those in FIG. 22 are shown with the same reference numbers.

The device for the estimation of further displacements has a structure similar to that described with reference to FIG. 23, the only slight difference being the structure of the displacement estimation computation device, of which a corresponding embodiment is shown in FIG. 26. The difference relates essentially to the use of two interpolation circuits 70 and 70bis and of two computation devices 74 and 74bis instead of one such circuit and device respectively.

Since all the other elements have structures similar to those in FIG. 2, these elements are shown in FIG. 26 with the same reference numbers.

The operation of the displacement estimation device is as follows. For each of the current points of the image, the switch 43 conveys an initial displacement vale $D_0$, found in the registers 39, to the interpolation circits 70 and 70bis and gradient computation devices 74 and 74bis. The value $D_0$ initializes the estimation. A bilinear interpolation computation is carried out on the one hand by the interpolation circuit 70 to determine the luminance $L(z-D_0x(Tj-Ta)/(Tb,Ta),Ta)$ of the current point $(z,Tj)$ displaced in the preceding frame of instant Ta having the value $D_0x(Tj-Ta)/(Tb-Ta)$ and, on the other hand, by the interpolation circuit 70bis to determine the luminance $L(z-D_0x(Tb-Tj)/(Tb-Ta),Ta))$ of the same current point, displaced this time in the following frame having the value $D_0x(Tb-Tj)/(Tb-Ta)$.

The displaced frame difference $DFD(z,D_0)$ and its absolute value are computed by the computation device 71. The switch 72 conveys the value computed by the computation device 71 to the decision means 36 when the value obtained is less than or equal to the threshold S defined previously. The displacement $D_0$ and the absolute value of the displaced frame difference $DFD(D_0)$ are applied to the inputs of the decision means 36. Otherwise, the result provided by the computation device 71 is applied to the input of the switch 72, then to the input of the decision means 36, when the value of the iteration i is equal to the maximum iteration value $i_{MAX}$. On the other hand, in the other cases, when the value of the iteration is less than the maximum value, the result provided by the computation device 71 is applied to the inputs of the correction computation unit 45 through the switch 46.

In the course of these computations which are carried out during a time T from the instant t=0, the gradients at the current point displaced in each frame of instants Ta and Tb (grad Xa, grad Ya) and (grad Xb, grad Yb) are computed in parallel in the devices 74 and 74bis. Then the values of gradients grad x and grad y determined by the relationships:

$$2 \times \text{grad } X = \text{grad } Xa + \text{grad } Xb$$

$$2 \times \text{grad } Y = \text{grad } Ya + \text{grad } Yb$$

are computed by the device 75. The computation device 75bis then computes a term of the type $G2 = 2(\text{grad}^2 X + \text{grad}^2 Y)$.

The relative parities of the frames of the instants Ta and Tj are taken into account in the circuits 70 and 74 and the relative parities of the frames of instants Tb and Tj are taken into account in the circuits 70bis and 74bis.

Depending on the value of G2, the switch 46 directs the result obtained either to the decision means 36 if the value of G2 obtained is less than or equal to a coefficient value equal, for example, to 0.125 or to the assembly for the computation of the correction terms of further displacements 45 and 47.

The computation device 76 computes, as before, the value defined previously. The value of the iteration i is increased by one unit by the increment computation device 77, and is returned to zero upon analysis of the following current point. The computation of the correction terms $(TC)^x$ and $(TC)^y$ for X and Y is carried out by the circuits 78. The values $(TC)^x$ and $(TC)^y$ obtained at the outputs of the computation device 78 verify the relationship:

$$(TC)^x = DFD(z, D_i) \times \text{grad}_x(D_i) \times$$

and $$\text{and } (TC)^y = DFD(z, D_i) \times \text{grad}_y(D_i) \times$$

The values $(TC)^x$ and $(TC)^y$ obtained are applied to the inputs of the comparator circuits 79 and 80 respectively to be limited, except as regards sign, to maximum and minimum values. According to a preferred embodiment of the invention, the minimum values of $(TC)^x$ and of $(TC)^y$ are the same and are set at 1/16 whereas the maximum value of $(TC)^x$ is set at 3 and the maximum value of $(TC)^y$ is set at equal to 2. The terms $(TC)^x$ and $(TC)^y$ obtained are added to the displacement values of $D^X_0$ and $D^Y_0$ by the circuits 81 and 82 and the results $D^X_1$ and $D^Y_1$ corresponding to the estimated shifts are again limited by the comparator circuit 83 before being applied to the second input of the switch 43. On the following iteration i (i=2), the switch 43 applies the estimated displacements $D^x_1$ and $D^y_1$ to the circuits 70, 70bis, 74, 74bis, 81 and 82.

At output from the decision means 36, a displacement is selected from the current point and is written in the zones MTDX and MTDY of the buffer memory 39. The value of the iteration i is returned to zero, the switch 43 returns to its initial position and the previously described computations are recommenced for estimation of the displacement of the new current point.

Figure 27:
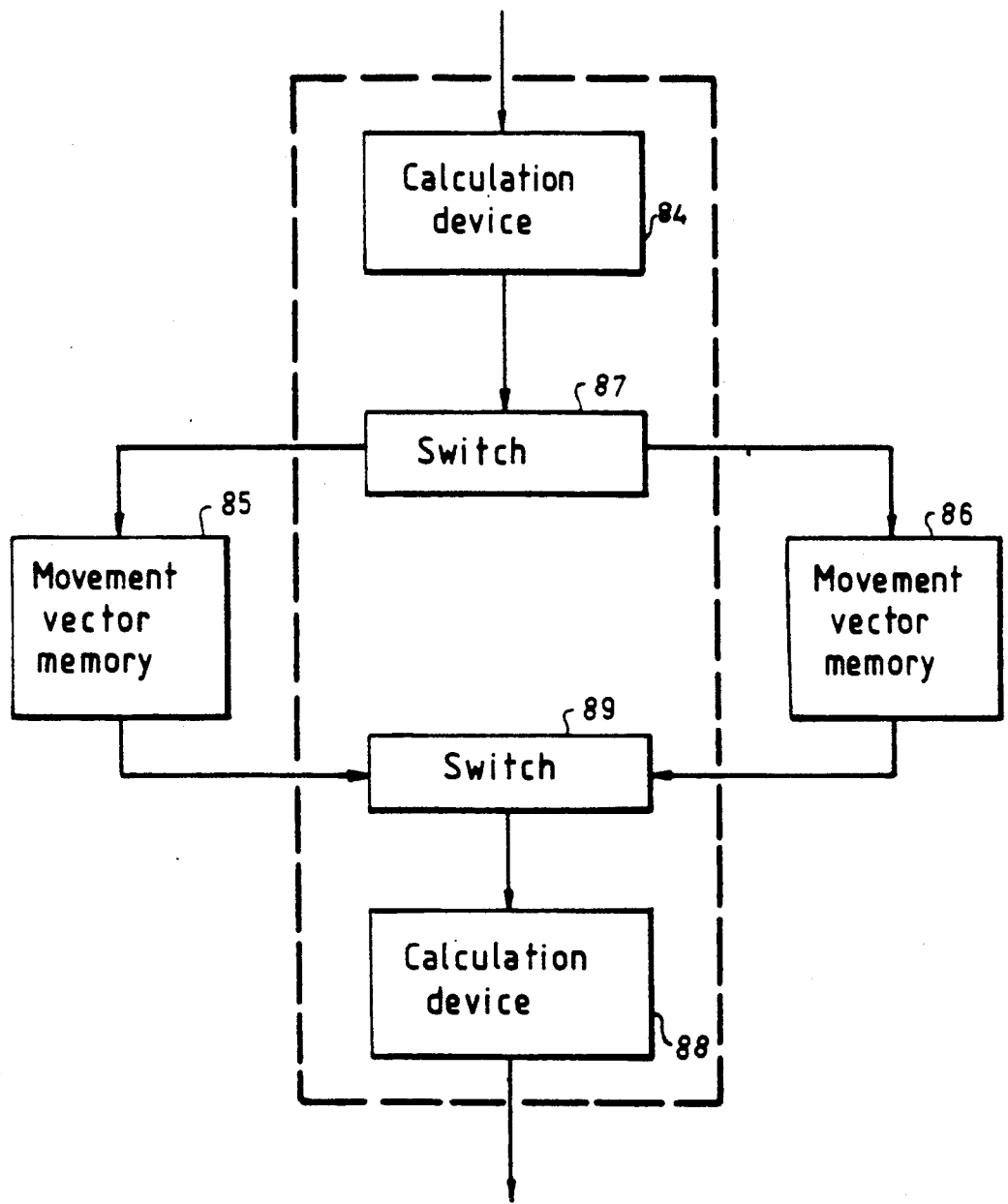

One embodiment of the temporal prediction device is shown in FIG. 27. It has a computation means 84 coupled with two memories 85 and 86 through a switch 87. The outputs of the memories 85 and 86 are connected to another computation device 88 through a switch 89.

The computation means 84 consists of a read-only or any equivalent device, and is addressed by the current motion vector. It computes the point of impact in the following image or frame, and the pixel closest to this point of impact, with which it associates the current motion vector. The switch 87 directs this vector to one of the memories 85 or 86. The memories 86 and 87 are in a "flip-flop" configuration. At output from these memories, the switch 89 selects the memory which being read. The computation device 89 detects and fills in the gaps in the motion field predicted in temporal fashion. The output of the computation device 88 is connected to the initialization assembly 39. In this device, the resolution of the conflicts is done in a simple fashion with the new vector associated with the current point overwriting the preceding vector associated with this point.

In the above-mentioned embodiments of the invention, it is clear that the greater the number of points taken into account and the greater the number of iterations used to carry out the computations, the greater would be the computation times. In these cases, to set the maximum limit on the computation times, an improvement in the preceding computation procedures may consist in carrying out the computations in one iteration only, limiting the spatial gradients computations solely to examining the four points closest to the end point of the displacement vector located in the current frame.

The procedure can then be summarized as the computation, in a single iteration and for each estimated displacement vector $D_{pj}$, of a displaced frame difference value $DFD(D_j)$ between the luminance of the current point and its luminance value in the preceding frame, offset by the distance $D_{pj}$, the mutual comparison of the DFD values obtained to select the estimated displacement vector $D_{pj}$ which corresponds to the lowest value $DFD(D_{pj})$, and the computation of the current displacement vector $D_j$ by execution of the gradient algorithm on the basis of the spatial gradient of the end point of the displacement vector located in the current frame and of the corresponding value $DFD(D_{pj})$.

By contrast with the previously described procedures, the method shown in FIG. 28 makes it possible to carry out motion estimations according to one or other of the variant embodiments of the invention using one iteration only.

In a first step, shown as 100 in FIG. 28, a displaced frame difference $DFD(D_{pj})$ value is computed for each displacement vector $D_{pj}$ estimated. Then, in step 101, a comparison between the absolute values of DFD is made in order to select the displacement vector $D_{pj}$ which gives the minimum displaced frame difference. The estimation of the current displacement vector $D_j$ is then carried out by execution of the steps 102 to 107. At the step 102, the spatial gradient at the ends of the displacement vector $D_{pj}$ is computed. This computation is carried out by considering, in each frame as shown in FIG. 29, the four pixels closest to the end of the displacement vector $D_{pj}$ contained in this frame. In FIG. 2, $L_1$, $L_2$, $L_3$ and $L_4$ designate the luminance values of each of these points. The value of the spatial gradient having components (GX, GY) in the horizontal and vertical image-scanning directions X and Y respectively is given in terms of the values $L_1$, $L_2$, $L_3$ and $L_4$ by the relationships:

$$GX = ((L_2-L_1)+(L_4-L_3))/2$$

and $$GY = ((L_3-L_1)+(L_4-L_2))/2$$

This operation is carried out for the frames $T_a$ and $T_b$. The gradient $D_{pj}$ is the average of two gradient vectors.

The computation of the new displacement vector $D_j$ takes place at the step 104 by application of the preceding gradient formula after evaluation at the step 103, as described previously, of the correction terms to be applied. Naturally, as has been explained above, the computed components of the displacement vector $D_j$ have to be limited and a test is carried out at the steps 105 and 106 to verify that the value $D_j$ obtained is between two pre-determined displacement values $-Dmax$ and $+Dmax$. If this is not the case, the value of $D_j$ adopted is that of the displacement $D_{pj}$ selected at the step 101.

This operation is carried out for each component separately. It is possible to carry out spatial filtration of the motion field obtained in this way by components (horizontal and vertical). This has the advantage, on the one hand, of eliminating noise from the field and, on the other hand, of homogenizing and specifying it in the zones of the image with homogeneous luminance, where the motion data cannot measured directly. This filtering may be carried out prior to temporal prediction for the definition of the new prediction field. It may, for example, consist of a median filtering procedure which has the effect of removing the noise from the signal, followed by an averaging filtering procedure which makes it possible, in particular, to specify the motion of the homogeneous zones.

As in the previously described methods, to avoid favoring one direction, horizontal or vertical, of the motion in the image, it is always possible to either to reverse the direction of horizontal scanning every second line in alternating fashion or again to reverse the direction of vertical scanning of an image every second line in alternating fashion. But it is also possible to make each image pair on which the motion is estimated undergo a rotation by one quarter of a turn so as to alter the direction of recursion for each image so that the combination of this rotation with the temporal tracking favors acceleration of the convergence of the motion estimator with the real motion.

Similarly, to fill in the gaps existing in the field of prediction of the motion after temporal projection, the procedure consisting, for the current gap, in considering the vectors, if present, of the four surrounding pixels and in defining the motion vector by the average of the existing vectors, remains valid. The gaps are examined by the methods shown in FIGS. 30, 31 and 32, by alternating the line scanning. The number of existing vectors is then a maximum of four and a minimum of two, with the pixels located in the causal part already having been processed. However, two variant methods are possible. A first may consist in selecting the vector that minimizes the absolute value of the displaced frame difference DFD for the current gap pixel in order to indicate the vector associated with the gap by going back to the vector indicated above. A second variant may also consist in in selecting the vector closest to the average of the vectors. Besides, in the case of some embodiments, one could also envisage not taking the vector of the preceding pixel into account if it corresponds to a gap: this would be because of considerations of processing in parallel. It is then possible to work according to the first variant or to take the vector of the last pixel which was not a gap according to the second variant, as shown in FIGS. 33 and 34.

Naturally, the method of temporal prediction which makes extensive use of the temporal correlation of the motion and allows rapid convergence of the recursive algorithm is still applicable. However, just as several spatial vectors are selected a priori in their causal environment, it is also possible to select several temporal predictors. For example, several motion prediction fields ca be obtained by various filtering procedures, by means for example of a battery of filters 108, 109, of the field of the motion resulting from the temporal projection, memorized, for example, in a memory 110 as shown in FIG. 35. Depending on the extent of the filtering of the motion field, the predictor field can be adapted either to the motion rupture zones or else to the zones of the image with homogeneous motion.

The method which has just been described can naturally be implemented by means of the above-described devices and also, as for the execution of previous methods, by using known microprocessor structures, appropriately programmed.

We claim:

1. A method for estimating motion in a sequence of television picture frames of moving images wherein each frame of the image is formed by a determined number of luminous points located at intersections of lines and columns, the method comprising the steps of:

estimating motion by execution of a gradient algorithm which minimizes a mean square deviation of local variations of luminance of a current point of a current frame of the image with respect to a homologous point homologous with the current point in a preceding frame of the image, initializing the algorithm by vectors of displacements estimated in several directions within the close casual vicinity of the current point, and an initial temporal prediction vector defined for each current point of each current frame of the image by the displacement vector of the homologous point in the preceding frame for which a point of projection in a direction of a displacement vector thereof in the current frame is closest to the current point, and propagating each estimation in a direction of scanning of the lines of each frame of the image.

2. A method according to claim 1, wherein, when several projections according to displacement vectors of points of a frame end up at a same point in the current frame, that displacement vector which gives the lowest displaced frame difference is adopted as a displacement vector.

3. A method according to claim 1 wherein, when no temporal displacement vector can be attributed to the current point because no adjacent point results from a projection by a displacement vector of the homologous point in the preceding frame that precedes the current frame, a motion vector resulting from an average of the motion vectors of the points that form part of its vicinity is attributed to a motion field gap thus formed.

4. A method according to claim 3, wherein the scanning direction of the lines of each frame is alternated every second line.

5. A method according to claim 4, further comprising the steps of:

selecting a direction of propagation of the algorithm as a function of a position, in the frame of the image, of the line to which the current point belongs, computing the modulus of the gradient of the current point, comparing the modulus with a pre-determined threshold value, selecting a displacement for the current point in the causal vicinity thereof when the modulus of the gradient obtained is below the pre-determined threshold value, adopting the displacement which gives the lowest displaced frame difference, and estimating a further displacement when the modulus of the gradient is greater than the value of the predetermined threshold.

6. A method according to claim 5, wherein, when the modulus of the gradient obtained is greater than the pre-determined threshold value, a simultaneous estimation computation is made of a determined number N of displacements on the basis of N initial displacement values and the displacement value $D_i(0<i<I_{MAX})$ with the lowest displaced frame difference $|DFD(D_i)|$ is adopted.

7. A device for estimating motion in a sequence of television image frames of a moving image, each image frame being formed by a predetermined number of luminous points located at intersections of lines and columns of each image frame, the device comprising:

an image memory for storing luminance values of a specific number of points surrounding a homologous point P(z,t-1), of a current point P(z,t), in a preceding image frame IMS(t-1) preceding a current frame of the current point IMS(t), a device for computing a modulus of a luminance gradient of the current point, a first and a second decision unit, and a displacement estimation device, wherein outputs of the first and second decision units are coupled with inputs of a switching device controlled by the device for computing the modulus of the current gradient, and wherein if the value of the modulus of the current gradient is less than or equal to a pre-determined threshold value, the displacement adopted is the displacement from the second decision unit, otherwise the displacement adopted is the displacement from the first decision unit.

8. A device according to claim 7, wherein the displacement estimation device comprises an initialization unit for storing initial displacements in several directions coupled with a computation set to compute, on the basis of the initial displacement values, displacement values for which the algorithm of the gradient converges.

9. A device according to claim 8, wherein the computation set is coupled to a decision unit to select the displacement value which gives the fastest convergence of the algorithm.

10. A device according to claim 9, wherein the computation set comprises, for each estimated displacement value $D_i(0 \leq i < I_{MAX})$, a convergence test unit coupled with a correction term computation unit and with a further displacement device for computing further displacements.

11. A device according to claim 10, wherein each convergence test unit comprises an interpolation circuit coupled with an absolute value computation for computation of the absolute value of a displaced frame difference and, a gradient computing device for computing the gradient coupled with a computing device for computing the sum of the squares of the displaced gradients obtained in two scanning directions of the image frame.

12. A device according to claim 11, wherein each correction term computation unit comprises a gain computing device for computing a gain of the algorithm of the gradient coupled with a correction device for computing increment and correction values.

13. A device according to claim 12, wherein each further displacement device for computing further displacements comprises subtractor circuits for computing displacement values as a function of correction terms computed by the correction term computation units.

14. A device according to claim 13, wherein each correction term (TC), provided by a correction term computation unit, is equal to the product of a displaced frame difference (DFD(z,D)) times the value of the gradient of the displaced point P(z-D,t-1) times the gain of the algorithm.

15. A method for motion estimation according to claim 6, further comprising the step of determining a motion field between two successive image frames (Ta, Tb) of a sequence of image frames in the form of a field of vectors attributed to an imaginary image frame (Tj) located in the vicinity of the two image frames (Ta, Tb).

16. A method according to claim 15, wherein the direction of scanning of the lines of the imaginary frame is alternated every second line.

17. A method according to claim 16, further comprising the step of estimating the motion of each point in the imaginary frame (Tg) in the form of a motion vector D(z,Tj) corresponding to a displacement of a current point P(z,Tj) between successive image frames at instants Ta and Tb, with a motion vector thereof passing through the current point P(z, Tj) and having ends thereof at the successive image frames at instants Ta and Tb respectively, estimation taking place by carrying out a computation by iteration of displacement vectors $(D_i(z,Tj))$ according to a gradient algorithm which brings to a minimum the mean square deviation of the local variations of luminance of the current point in the imaginary frame Tj.

18. A method according to claim 17, wherein each displacement $(D_i(z,Tj))$ of an iteration i is obtained on the basis of a displacement vector $D_{i-1}(z,Tj)$ obtained in a preceding iteration by the relationship:

$$D_i(z,Tj) = D_{i-1}(z,Tj) - (DFD(z,D_{i-1}) \cdot \text{grad } L(z,D_{i-1})) \cdot 2(\text{grad } L(z,D_{i-1}))$$

where: z designates the coordinates in space of the current point (Pz,Tj) for which the motion vector D(z,Tj) is estimated;

DFD(z, $D_{i-1}$) designates the displaced frame difference computed between the successive frames at instants Ta and Tb; and grad L(z,$D_{i-1}$) designates the spatial gradient as the half-sum of the spatial gradients at the ends of the displacement vector $D_{i-1}$ on the successive frames at the instants Ta and Tb.

19. A method according to claim 18, wherein the estimation of the motion vector D(z,Tj) for the current point of the pixel P(z,Tj) is computed on the basis of five initialization vectors corresponding to four motion vectors already computed for four adjacent points in the casual vicinity of the current point and to an initial temporal prediction vector estimated for the current point, with the five initialization displacement vectors giving rise to five estimated motion vectors, only that motion which, from among the five estimated vectors, gives convergence of the algorithms of the gradient with the lowest inter-frame difference being adopted.

20. A method according to claim 19, wherein the displaced frame difference DFD(z,$D_{i-1}$) is obtained by operating the temporal difference in the direction of the displacement $D_{i-1}$ of the luminance values of the current point P(z,Tj) displaced in the successive frames at instants Ta and Tb.

21. A method according to claim 20, wherein luminances LA and LB of the current point displaced respectively in the frames of instants Ta and Tb are obtained by bilinear interpolation of the values of luminance In of the four pixels surrounding the end point of the vector considered, in Ta and Tb respectively.

22. A method according to claim 21, wherein each displacement vector $D_i$ is obtained by subtraction from the displacement vector $D_{i-1}$, computed at a preceding iteration, of a correction term equal to the product of the displaced frame difference DFD(z, $D_{i-1}$) and the spatial gradient of luminance grad L(z, $D_{i-1}$), and the reciprocal of the half-sum of the spatial gradients at the ends of the displacement vector $D_{i-1}$ on the successive frames at instants Ta and Tb.

23. A device for estimating motion in a sequence of television image frames of a moving image, each image frame being formed by a determined number of luminous points located at intersections of lines and columns of each image frame, the device comprising:
a line memory coupled with an image frame memory for respectively storing luminance values of a specific number of points of the image frame surrounding homologous points of a current point P(z,Tj) of a current image frame and the points surrounding the current point in successive frames at instants Ta and Tb,
a displacement estimation device coupled with the line memory with the frame image memory, and
a decision unit to compute, on the basis of the luminance values of the points contained in the line memory and the frame memory and on the basis of at least one initial displacement value contained in an initialization unit, a displacement vector for each current point P(z,Tj) of each current image frame.

24. A device according to claim 23, wherein the displacement estimation device comprises at least one convergence test unit, a correction term computation unit and a unit for the computation of a further displacement.

25. A device according to claim 24, wherein a convergence test unit comprises a first interpolation circuit to determine the luminance of the current point displaced in the frame of instant Ta, a second interpolation circuit to determine the luminance of the current point displaced in the frame Tb, and a computation device coupled with the first and second interpolation circuits to compute, as a function of the luminance values computed by the first and the second interpolation circuit, an absolute value of a displaced frame difference, with the output of the computation device being coupled with the decision unit through a first and a second change-over switch; and a first and a second device for gradient computation coupled with a third computation device for computing an average of gradients formed by the first and second computation device, with the third computation device being coupled with a fourth computation device for computing a sum of the squares of the average gradients displaced.

26. A device according to claim 25, wherein a correction term computation unit comprises a fifth computation device for computing a value $\epsilon$ equal to the reciprocal divided by two of the sum of the squares of the average gradients displayed provided by the fourth computation device coupled through an increment computation device with a correction computation device coupled, with the third computation device and, with a second change-over switch for computation of correction terms as a function of the absolute value of the displaced frame difference provided by the computation device and the value $\epsilon$, and at least one comparator circuit to limit the value of the correction terms obtained from the correction computation device.

27. A device according to claim 26, wherein a unit for the computation of further displacements comprises subtractor circuits for subtraction of the correction terms in each new iteration ordered by the increment computation device from the displacement value computed in a preceding iteration and stored in the initialization unit, in order to obtain the new displacement values in each new iteration and store them in the initialization unit.

28. A device according to claim 27, wherein the initialization unit is coupled with a temporal prediction device enabling the computation of a point of impact in a frame following the current frame and a point closest to the point of impact, associating the point of impact with the motion vector of the current point.

29. A method for estimation of motion in a sequence of moving images according to claim 22, further comprising the steps of:
computing, in a single iteration and for each estimated displacement vector $D_{pj}$, a value DFD($D_{pj}$) of a displaced frame difference between the luminance of the current point and a luminance value thereof in the preceding frame offset by the distance of the displacement vector $D_{pj}$,
comparing the absolute values of the DFD values obtained to select the estimated displacement vector $D_{pj}$ which corresponds to the lowest absolute value of DFD($D_{pj}$), and
computing the current displacement vector $D_j$ by execution of the gradient algorithm on the basis of the displacement vector selected and the corresponding value DFD($D_{pj}$).

30. A method according to claim 29, wherein the spatial gradient of the current point is computed in taking into account only the four points closest to each end point of the displacement vector.

31. A method according to claim 30, wherein the gradient of each displacement vector end point is computed by measuring, on each line located close to either side of the end point of the displacement vector, the difference in the luminance values ($L_1$, $L_2$, $L_3$, $L_4$) of the two points on each line adjacent to the end point of the displacement vector, taking the average of the luminance differences obtained on each line.

32. A method according to claim 31, wherein the gradient of each end point of the displacement vector is computed in the direction of vertical scanning of the image in measuring, on each column located in the proximity and on either side of the end point of the displacement vector, taking the average of the luminance differences obtained on each column.

33. A method according to claim 32, further comprising subjecting each image pair on which motion is estimated to a rotation of one quarter turn.

34. A method according to claim 33, further comprising the step of, for filling in gaps present in the motion prediction field after temporal projection, if present, considering for each current gap the vectors of the four pixels surrounding it and defining the motion vector as the average of the components of the existing vectors.

35. A method according to claim 34, further comprising the step of, for definition of a vector associated with a gap, selecting the vector which minimizes the absolute value of the displaced frame difference DFD for the current gap pixel.

36. A method according to claim 34, further comprising the step of selecting the vector closest to the average of the existing vectors.

37. A method according to claim 36, further comprising the step of defining several temporal predictors for each point of the current image by filterings, using a battery of filters, of the motion field resulting from the temporal projection.

38. A method according to claim 37, further comprising the step of carrying out spatial filtering of the motion field before temporal projection to define each new projection field.

* * * * *